United States Patent [19]

Brown et al.

[11] Patent Number: 5,061,934

[45] Date of Patent: Oct. 29, 1991

[54] HYBRID CLUTTER CANCELLATION METHOD AND SYSTEM FOR IMPROVED RADAR PERFORMANCE

[75] Inventors: Russell D. Brown, Holland Patent; Donald D. Weiner, Fayetteville; Michael C. Wicks, Utica, all of N.Y.

[73] Assignee: The United States of America as represented by the Secretary of the Air Force, Washington, D.C.

[21] Appl. No.: 611,217

[22] Filed: Nov. 9, 1990

[51] Int. Cl.$^5$ .................. G01S 13/534; G01S 7/295
[52] U.S. Cl. .................................. 342/162; 342/159
[58] Field of Search .............................. 342/159, 162

[56] References Cited

U.S. PATENT DOCUMENTS

| | | | |
|---|---|---|---|
| 3,611,369 | 10/1971 | Maguire | 342/159 X |
| 3,894,219 | 7/1975 | Weigel | 342/159 X |
| 4,003,052 | 1/1977 | Adelman et al. | 342/159 X |
| 4,015,260 | 3/1977 | Campbell, Jr. | 342/162 |
| 4,104,631 | 8/1978 | Weigle et al. | 342/159 X |
| 4,137,533 | 1/1979 | Briechle et al. | 342/162 |
| 4,249,177 | 2/1981 | Chen | 342/159 |
| 4,586,043 | 4/1986 | Wolf | 342/159 X |
| 4,661,816 | 4/1987 | Musha et al. | 342/159 X |

Primary Examiner—Gilberto Barron, Jr.
Attorney, Agent, or Firm—William G. Auton; Donald J. Singer

[57] ABSTRACT

A system is disclosed for use with radar systems so as to reduce the dynamic range requirement of the analog to digital converter through analog clutter cancellation prior to digitization. Clutter return estimates are formulated via modern digital signal processing techniques, converted to analog representation, and subtracted from the received waveform. Typically, the MTI cancellation is performed on the quadrature components of the received signal. The complex residue is then processed for target detection. This quadrature processing is not illustrated in the figures. In practice, sampling the received waveform prior to baseband down conversion, at an intermediate frequency, is also feasible. Digital synchronous detection and coherent MTI processing are then implemented in the digital signal processor. Rather than employ a radar signal processor which is either all analog or all digital it is beneficial to utilize hybrid schemes which capitalize on the advantages of both. A hybrid system is disclosed in which the acoustic delay line, which fundamentally limits analog MTI canceller performance, is replaced by a digital delay line. In effect, the transmitter crystal, delay medium, and receiver crystal are replaced by the analog to digital converter, digital delay, and digital to analog converter. The hybrid clutter canceller with digital processor and analog waveform synthesizer utilizes modern signal processing techniques to estimate the clutter return which is subtracted from the incoming analog signal. The full dynamic range of the received signal is not presented to the analog to digital converter, reducing the number of bits required for target detection in clutter. In effect, application of the hybrid clutter canceller reduces the A/D converter probability of saturation for a given A/D converter.

4 Claims, 2 Drawing Sheets

HYBRID CLUTTER CANCELLATION METHOD AND SYSTEM FOR IMPROVED RADAR PERFORMANCE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar systems, and more specifically the invention pertains to a clutter reduction system for improving radar receiver performance.

The are several fundamental limitations to radar target detection performance. For example, signal dynamic range is defined to be the ratio of the largest to the smallest signal (variance) presented to the analog to digital converter, Signal dynamic range is determined primarily by the magnitude of the clutter return as compared to that of the target plus noise. The purpose of this invention is to reduce the clutter component of the signal prior to digitization, thus reducing the dynamic range requirement of the analog to digital converter. Improved radar performance is equivalent to increased target detection probability (for a given probability of false alarm) and is accomplished through reduced analog to digital converter probability of saturation, and increased subclutter visibility.

The task of reducing the clutter of radar systems is alleviated, to some extent, by the systems disclosed in the following U.S. Patents, the disclosures of which are incorporated herein by reference:

U.S. Pat. No. 3,611,369 issued to Maguire;
U.S. Pat. No. 3,894,219 issued to Weigle;
U.S. Pat. No. 4,003,052 issued to Adelman;
U.S. Pat. No. 4,104,631 issued to Weigle; and
U.S. Pat. No. 4,586,043 issued to Wolf.

The patent to Weigle (631) teaches a clutter elimination system by integrating signal returns over different half look periods. The patent to Maguire (369) teaches a quantizer system which includes automatic clutter elimination in each of a plurality of annular sectors under surveillance. The patent to Weigel (219) teaches a comb filter as a clutter canceller. The patent to Wolf (043) teaches a distribution sensitive constant false alarm rate (CFAR) processor for deriving the clutter threshold level from the average magnitude of echo return signals. The patent to Adelman (052) teaches the use of a moving target indicator (MTI) for reducing low frequency clutter signals.

Conventional methods for reducing signal dynamic range in radar receivers include the use of hard limiters, limiting amplifiers, and logarithmic amplifiers. Sensitivity Time Control and (Instantaneous) Automatic Gain Control also reduce the likelihood of receiver saturation. However, all of the above techniques degrade performance for the detection of weak signals in the presence of strong interference. The subject invention provides an alternate technique to reduce signal dynamic range, through analog clutter cancellation.

SUMMARY OF THE INVENTION

The present invention includes a hybrid clutter cancellation system for use with a radar system which has a radar antenna and a radar receiver. The radar antenna produces output signals when it receives radar echo return signals which contain clutter echo return signals and moving target echo return signals. The radar receiver produces output signals by receiving and amplifying the output signals of the radar antenna.

The hybrid clutter cancellation system uses an analog amplifier summing unit to subtract a digitally-produced estimate of the clutter echo return signals from the analog output signals of the radar waveform which may be either at baseband, intermediate, or radio frequencies. This radically reduces the dynamic range of the radar signals before they are converted into digital signals for the digital data processor.

As mentioned above, there are several fundamental limitations to radar target detection performance. The present invention is a hybrid digital and analog system which addresses one critical limitation, and is designed to provide a reduced dynamic range requirement in the analog to digital converter Analog to digital converters limit the dynamic range of modern receivers, and the present invention reduces signal dynamic range prior to digitization, through analog clutter cancellation.

In one embodiment of the invention, the output signals of the radar receiver are: converted into digital (by an A/D converter) delayed (by a digital delay) and recovered into analog signals (by a D/A converter) for the analog amplifier summer unit. Since the signal components of clutter are representations of radar echo signals from an unchanging background, a delayed analog signal should have approximately the same clutter signal component as a current analog radar echo signal. The subtraction of the delayed signal from a current signal should leave only the changed echo signals, which represent the radar reflections from a moving target.

In another embodiment of the invention, a digital data processor controls a waveform generator to produce an analog clutter estimate signal. The analog amplifier summer unit subtracts the analog clutter estimate from the radar waveform to reduce the dynamic range requirement of the analog to digital converter.

It is an object of the present invention to reduce the dynamic range of radar echo return signals before they are converted into a digital representation.

It is another object of the present invention to use digital signal processing techniques to produce an MTI signal for a radar display system.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a hybrid clutter cancellation system for improving the performance of a radar system by reducing signal dynamic range prior to analog to digital conversion, through analog clutter cancellation. The present invention provides increased target detection probability for a given false alarm rate in severe clutter environments.

Figure 1:
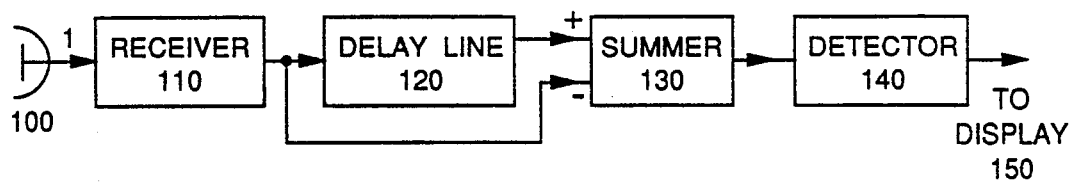
FIG. 1 is a block diagram of the elements of a moving target indication radar system.

The reader's attention is now directed towards FIG. 1, which is an illustration of an analog moving target indication (MTI) radar receiver with a delay line canceller. MTI systems are discussed in texts such as M. Skolnik's "Introduction to Radar Systems" published by McGraw Hill in New York in 1980, the disclosure of which is specifically incorporated by reference. The purpose of an MTI radar is to display primarily information about moving targets. The system of FIG. 1 extracts the moving target echo from the clutter echo by subtracting an echo return signal from a delayed echo return signal to eliminate signals from unchanging sources of radar return signals. Unchanged sources of radar return signals have not moved over the delay period.

The system of FIG. 1 receives reflected radar echo signals using an antenna 100. This antenna may be either the parabolic dish sensor system or the more modern phased array antenna.

The receiver 110 is electrically connected with the antenna 100 so that it receives and amplifies the relatively faint radar echo signals. The radar echo return signals include clutter echo return signals (from the ocean, land, buildings) as well as target echo return signals. Usually the clutter echo return signals are of no interest, but the target echo return signals can be comparatively faint for targets which have small radar cross sections.

The delay line 120 is an analog device which receives and delays amplified radar echo return signals from the receiver 110. The summer 130 is an analog amplifier which has both a positive and an inverting input terminal. In FIG. 1, the summer 130 subtracts radar echo return signals from a set of delayed radar each return signals to eliminate common signal components from the radar echo signals. As mentioned above, the common signal components are believed to be reflections from objects which have not moved during the delay period. Thus, the summer 130 forwards target echo return signals to the detector 140 and display 150.

Figure 2:
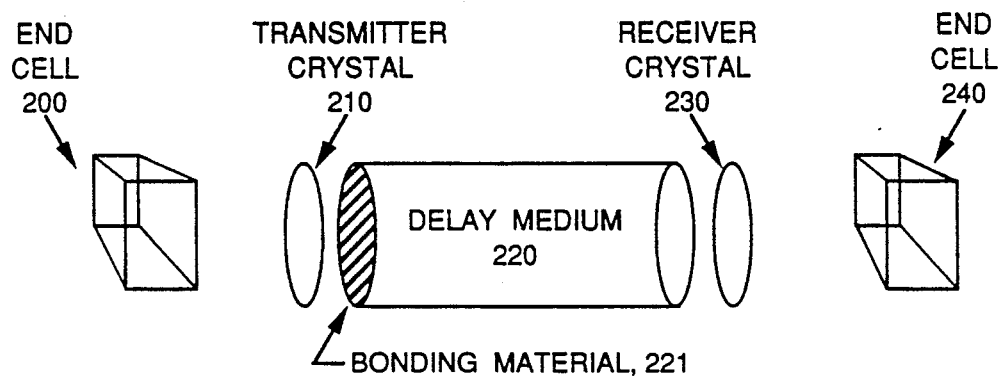
FIG. 2 is an illustration of the basic elements of an analog delay line used in the system of FIG. 1.

FIG. 2 is an illustration of the basic elements of an analog delay line. These include two end cells 200, 240, a delay medium 220, a transmitter crystal 210 and a receiver crystal 230. The use of delay lines, power splitters and combiners in a delay line canceller allows for the rejection of correlated clutter returns in the analog domain. The present state of the art in delay line and transducer technology limits the average subclutter visibility of analog MTI cancellers to about 20 decibels. The sensitivity of acoustic delay lines to factors such as vibration and temperature variation restricts their applicability to relatively benign environments. Also, analog MTI cancellers are not usable in radar systems employing waveform (parameter) diversity.

Figure 3:
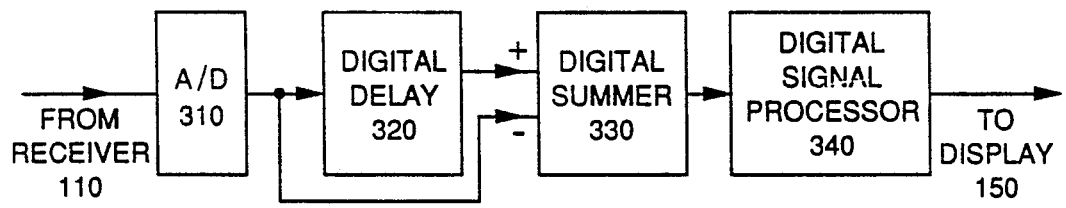
FIG. 3 is a block diagram of some of the elements of an MTI radar with a digital delay line canceller.
Figure 4:
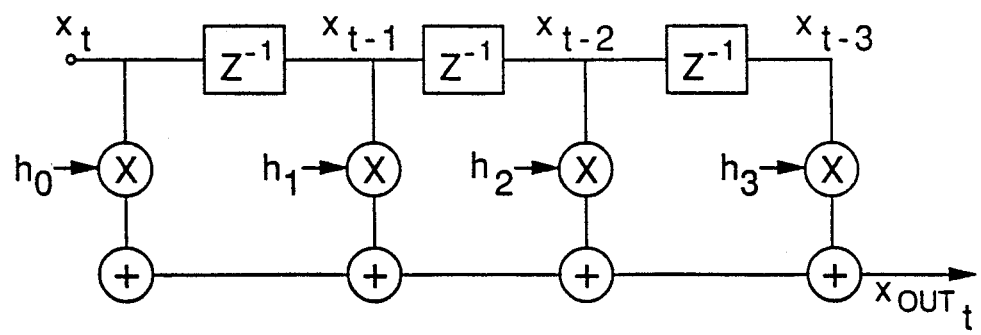
FIG. 4 is a schematic of a nonrecursive digital filter for MTI radar applications.

With the advent of cost effective digital technology, MTI processing transitioned naturally from analog to digital implementation, with vastly improved performance over existing analog techniques. In FIGS. 3 and 4, an MTI radar digital delay line canceller, and a non-recursive digital filter are used.

The system of FIG. 3 operates to eliminate clutter echo returns in the same manner as the system of FIG. 1 using: an A/D converter 310, a digital delay 320, a digital summer 330, a digital signal processor 340 and a display 150. The A/D converter 310 converts received analog echo return signals from the radar receiver 110 into digital signals.

As with the radar in FIG. 1, the radar echo return signals received in FIG. 3 contain both a clutter echo return signal (which is reflected from a non-moving background) and a target echo return signal (which is reflected from a moving target). The digital delay 320 produces a delayed echo return signal which is received by the digital summer 330.

The digital summer 320 subtracts a current radar echo return signal (from the radar receiver 110) from the delayed echo return signal (received from the digital delay 320) in order to eliminate the clutter echo return signal characteristics (which is common to both the current radar return signal and the delayed radar return signal). Thus, the digital signal processor 340 in FIG. 3 receives only signals which represent target echo return signals.

FIG. 4 is a block diagram of a typical non-recursive digital filter for use with digital MTI radar systems such as that of FIG. 3. The digital filter can be implemented with a multiplier-accumulator chip, such as TRW model TDC1043J. By proper selection of the weights $h_0$ through $h_3$ in FIG. 4, and with the use of external memory, this chip is configurable as either a two, three or four pulse canceller. Due to the pulsed nature of the transmitted waveform, the radar samples the environment at the pulse repetition frequency. For ease of discussion, only one analog to digital converter sample per pulse for each resolution cell is considered. However, to combat thermal noise limitations, multiple samples per pulse are integrated in practice to improve signal to noise ratio. Present high speed memory and computer technology is adequate for real time coherent digital processing of radar returns. However, a substantial degradation in clutter cancellation performance arises from the limitation in dynamic range due to analog to digital converters. As such, the subclutter visibility of the radar (i.e., MTI improvement factor) is often limited by hardware, and not clutter decorrelation characteristics. Because clutter cancellation occurs after digitization, the signal dynamic range dictates the use of high linear dynamic range receiver technology up to and including the analog to digital converter.

The present invention reduces the severity of this problem by easing the dynamic range requirement of the analog to digital converter through analog clutter cancellation prior to digitization. Clutter return estimates are formulated via modern digital signal processing techniques, converted to analog representation, and subtracted from the received waveform. Typically, the MTI cancellation is performed on the quadrature components of the received signal. The complex residue is then processed for target detection. This quadrature processing is not illustrated in the FIGS. In practice, sampling the received waveform prior to baseband down conversion, at an intermediate frequency, is also feasible. Digital synchronous detection and coherent MTI processing are then implemented in the digital signal processor.

Figure 5:
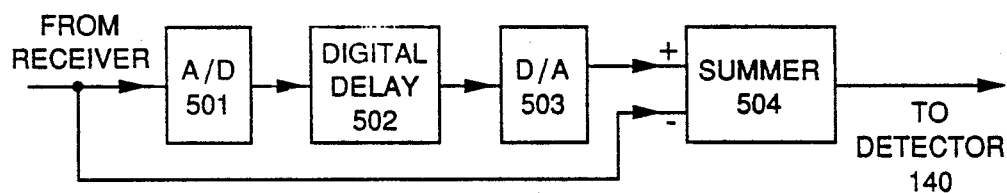
FIG. 5 is a block diagram of an analog MTI canceller with a digital delay line.

Rather than employ a radar signal processor which is either all analog as in FIG. 1, or all digital as in FIG. 3, it is beneficial to utilize hybrid schemes which capitalize on the advantages of both. A hybrid system is shown in FIG. 5, in which the acoustic delay line, which fundamentally limits analog MTI canceller performance, is replaced by a digital delay line. In effect, the transmitter crystal, delay medium, and receiver crystal in FIG. 2 are replaced by the analog to digital converter 501, digital delay 502, and digital to analog converter 503, respectively, of FIG. 5.

The A/D converter 501 converts current analog radar echo return signals from the radar receiver into a digital equivalent. The digital delay 502 outputs a delayed digital radar return signal by delaying the output of the A/D converter 501. The D/A converter 503 outputs a delayed analog radar return signal by converting the output of the digital delay 502. The summer 504 subtracts a current analog radar return signal (from the receiver) from the delayed analog radar return signal (received from the D/A converter 503) to eliminate clutter echo return signals.

The analog MTI canceller with digital delay line illustrated in FIG. 5 assumes a zero order approximation to the clutter model, and does not take advantage of modern signal processing techniques to estimate the clutter return. In addition, the full dynamic range of the received radar return is presented to the analog to digital converter. However, because the sole purpose of the circuitry in the upper path between the receiver and the summer is to provide a delayed analog representation of the clutter return, the linear dynamic range required for target detection may not be needed.

Figure 6:
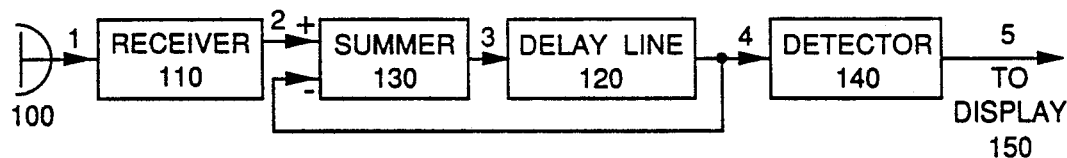
FIG. 6 is a block diagram of a recursive MTI canceller.

As opposed to the canceller in FIG. 1, where cancellation occurs after the acoustic delay line, an analog MTI canceller which rejects clutter at a point prior to the input of the delay line is shown in FIG. 6. The disadvantage achieved using this configuration is reduced signal dynamic range at the input to the analog delay line. However, this recursive MTI canceller is limited by the sophistication of the processing performed to predict the clutter return. As discussed above, the use of analog delay lines also prohibits the use of such cancellers in radar systems employing waveform diversity. To alleviate this problem, consider the hybrid system shown in FIG. 7 which is similar to the one illustrated in FIG. 5.

Figure 7:
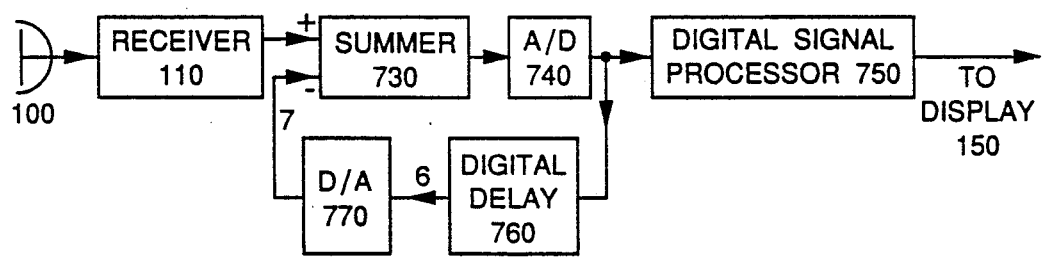
FIG. 7 is a block diagram of a recursive analog MTI canceller with a digital delay line.

FIG. 7 is a block diagram of a recursive analog MTI canceller radar system which uses: an antenna 100, a radar receiver 110, a summer 730, an A/D converter 740, a digital delay 760, a D/A converter 770, a digital signal processor 750 and a display 150.

The radar antenna receives analog radar echo return signals which are amplified by the radar receiver 110, and conducted into the summer unit 730.

The summer unit subtracts a delayed analog radar echo return signal (from the D/A converter 770) from the current analog radar echo return signal (from the receiver 110) to output an MTI analog echo signal. The A/D converter outputs a digital MTI analog signal to the digital signal processor 750, and to the digital delay 760.

The digital delay delays the output of the A/D converter to produce a delayed digital radar echo return signal. The delayed digital radar echo return signal is converted into a delayed analog radar echo return signal by the D/A converter 770, and is sent to the summer unit 730.

The delay loop of FIG. 7 produces a digital MTI echo signal every odd cycle, and a clutter echo return signal every even cycle. The process occurs as follows. When the first radar echo return signal is received, it is converted into digital, delayed converted into analog, and subtracted from the second radar echo return signal. In this first cycle, common signal characteristics (clutter echoes) are eliminated, and the A/D converted outputs a digital MTI signal to the digital signal processor 750.

When it digital MTI signal is delayed, converted to analog, and subtracted from a subsequent radar echo return signal, the summer 730 outputs a clutter echo return signal to the digital signal processor 750, and the digital delay 760.

When the clutter echo return signal is delayed, converted into analog, and subtracted by the summer unit 730, a moving target indication signal is once again forwarded to the digital signal processor 750 and the digital delay 760.

Figure 8:
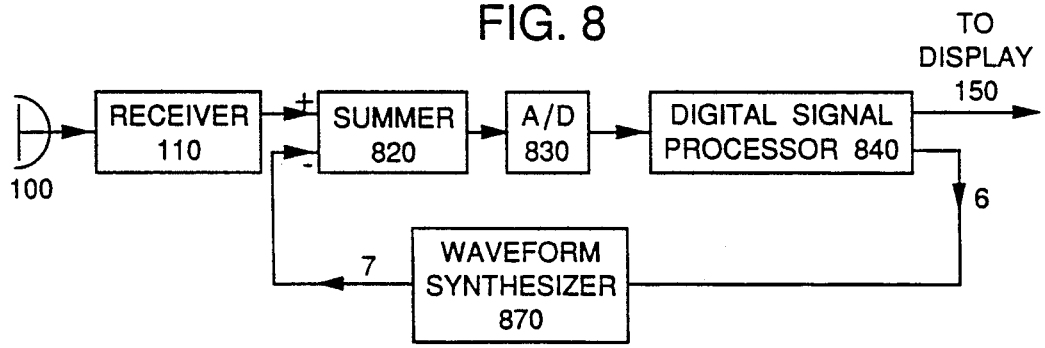
FIG. 8 is a block diagram of the hybrid clutter cancellation system of the present invention.

The use of a digital delay line permits the recursive MTI canceller to be used with radar employing diverse transmitted signals such as staggered pulse repetition frequency waveforms. The dynamic range limitation associated with post delay line cancellation is also reduced. However, the effects of finite word length, known as limit cycle instability, effects of finite word length, known as limit cycle instability may be troublesome in this Infinite Impulse Response filter. These performance limitations are eliminated in the present invention. As shown in FIG. 8, the the digital signal processor 840 is programmed to predict the clutter return using modern digital signal processing techniques and the measured time history of the clutter return from range azimuth cells of interest. Clutter estimates are converted to analog representation by the waveform synthesizer 870, and subtracted from the analog received waveform. Because quadrature components are utilized in coherent processing, the waveform synthesizer 870 can readily generate either complex signals at baseband, or modulated signals on a reference carrier frequency. Therefore, clutter cancellation can be performed either at baseband (as illustrated in FIG. 8), intermediate, or radio frequencies. Using sophisticated clutter prediction filters which utilize long observation time intervals to characterize the environment, and by placing modest constraints on the spectral width of the clutter estimate formulated by the digital signal processor, the subject invention eliminates target blind velocities.

The system of FIG. 8 is a block diagram of the hybrid clutter cancellation system of the preferred embodiment of the invention. The system of FIG. 8 resembles the system of FIG. 7 in a number of key features. Both systems use a hybrid of digital and analog cancellation technology to cancel clutter from radar echo return signals. Both systems eliminate clutter before the analog signal is converted into a digital signal in order to reduce the dynamic range of received signals. The radar receiver 110, analog summer unit 820, and A/D converter 830 of FIG. 8 operate just like their counterparts of FIG. 7. The digital signal processor outputs a MTI detection signal to the display 150 and a digital clutter reflection signal to the waveform synthesizer 870.

The waveform synthesizer 870 of FIG. 8 receives a digital clutter reflection signal from the digital signal processor 840, and outputs a delayed analog clutter reflection signal to the summer 820. This function can be accomplished by the digital delay unit 760 and D/A converter 770 of FIG. 7, or an analog signal generator.

When a commercially available analog signal generator is used to produce a delayed analog clutter reflection signal, the waveform synthesizer 870 is controlled by the digital signal processor using the signal model algorithms of the appendix. These signals are narrowband modulated waveforms that approximate the radar reflections produced by the unchanging background.

Different modern signal processing techniques can be used to estimate the clutter. In general, the clutter will be modeled as an all-pole, all-zero, or pole-zero process. Depending upon the clutter model chosen, a variety of estimation schemes are possible. By way of example, a Kalman filter estimator for an all-pole clutter model is presented in the appendix. The Kalman filter can also be extended to all-zero and pole-zero models. Other forms of the clutter estimator include, but are not restricted to, the Weiner filter, the linear prediction filter, the lattice filter, the minimum variance distortionless response filter, the Levinson (all-pole) filter, the Levinson (all-zero) filter, and prediction-error filters. Various adaptive signal processing techniques, based on a variety of adaptation algorithms such as the least mean-square and recursive least mean square approaches, can also be used to estimate the clutter.

The clutter estimate is forwarded in a real time digital signal processor, converted to analog representation, and subtracted from the analog radar waveform. Various methods for estimating the clutter return are currently known, including use of the discrete time Kalman Filter. For implementation of the Kalman Filter, an autoregressive state space model is used as described in the computer Program Algorithm Appendix.

For the configuration shown in FIG. 8, the analog to digital converter is required only to digitize the difference between the incoming target plus clutter waveform and the clutter estimate generated by the waveform synthesizer. If the estimate approximates the clutter component closely, the remaining residue after the summer unit is composed primarily of desired signal. In practice, even allowing for significant clutter estimation errors, a substantial amplitude reduction is still achieved, amounting to two or three bits of effective analog to digital converter dynamic range improvement. This improvement alone is sufficient to reduce or eliminate analog to digital converter saturation and permit detection of radar targets which would otherwise have been lost due to the hard limiting effect caused by the clutter.

The input sequence to the digital signal processor after the A/D converter 830 consists of a quantized version of the desired target return plus the clutter error signal (or clutter innovations process). The error signal contains all of the statistical clutter information needed for optimal target detection. In fact, in the absence of quantization errors and the non-ideal behavior of the converter, the original clutter signal can be reconstructed by passing the clutter innovations process through a causal inverse filter. The optimal detection algorithm implemented in the digital signal processor serves to extract the desired signal from the clutter innovations background. In this manner, the digital signal processor executes algorithms for both clutter cancellation and target detection. A clutter estimate is provided to the waveform synthesizer while the target output to be displayed is provided to the display.

SIGNAL PROCESSING ALGORITHM APPENDIX

1. Signal Models

All signals are assumed to be narrowband modulated waveforms, even after having been mixed down to the radar IF frequency, $\omega_{IF}$. Let
 s(t) = desired radar return
 y(t) = additive clutter
 n(t) = additive noise.
In general, the narrowband modulated signal can be written in the form $$x(t) = |x(t)|\cos[\omega_{IF}t + \phi_x(t)] = Re(|x(t)|e^{j\phi_x(t)}e^{j\omega_{IF}t}).$$

Let the complex envelope of x(t) be defined by $$x(t) = |x(t)|e^{j\phi_x(t)}.$$

Then $$x(t) = Re[x(t)e^{j\omega_{IF}t}].$$

Observe that x(t) contains both the amplitude modulation, $|x(t)|$, and phase modulation, $\phi_x(t)$. Specifically, $$|x(t)| = |x(t)| \quad \phi_x(t) = \frac{1}{j}\ln\left(\frac{x(t)}{|x(t)|}\right).$$

The narrowband assumption implies that $|x(t)|$ and $\phi_x(t)$ vary slowly relative to $e^{j\omega_{IF}t}$. Consequently, the highest significant frequency components of $|x(t)|$ and $\phi_x(t)$ are assumed to be much less than the IF frequency, $\omega_{IF}$.

Utilizing the fact that $$\cos(\alpha+\beta) = \cos\alpha\cos\beta - \sin\alpha\sin\beta,$$

x(t) can be expressed as $$X(t) = |x(t)|\cos\phi_x(t)\cos\omega_{IF}t - |x(t)|\sin\phi_x(t)\sin\omega_{IF}t.$$

Define the quadrative components of x(t) to be $$x_I(t) = |x(t)|\cos\phi_x(t)$$

$$x_Q(t) = |x(t)|\sin\phi_x(t).$$

The expression for x(t) then becomes $$x(t) = x_I(t)\cos\omega_{IF}t - x_Q(t)\sin\omega_{IF}t.$$

Let the real and imaginary parts of the complex envelope be donoted by $x_r(t)$ and $x_i(t)$, respectively. Hence, $$x(t) = x_r(t) + jx_i(t).$$

If follows that $$\begin{aligned} x(t) &= Re(x(t)e^{j\omega_{IF}t}) \\ &= Re([x_r(t) + jx_i(t)][\cos\omega_{IF}t + j\sin\omega_{IF}t]) \\ &= x_r(t)\cos\omega_{IF}t - x_i(t)\sin\omega_{IF}t. \end{aligned}$$

Comparison of Eqs. (1) and (2) reveal that $$x_I(t) = x_I(t)$$

$$x_Q(t) = x_Q(t).$$

Hence, $$x(t) = x_I(t) + jX_Q(t) = |x(t)|e^{j\phi(t)}.$$

It follows that the magnitude and phase of the complex envelope are related to the quadrature components of x(t) by $$|x(t)| = \sqrt{x_I^2(t) + x_Q^2(t)}$$

$$\phi_x(t) = \tan^{-1}\frac{x_Q(t)}{x_I(t)}.$$

Following the discussion for x(t), we have $$s(t) = Re[s(t)e^{j\omega_{IF}t}],$$

$$y(t) = Re[y(t)e^{j\omega_{IF}t}],$$

$$n(t) = Re[n(t)e^{j\omega_{IF}t}]$$

The complex envelopes and quadrature components are related by $$s(t) = |s(t)|e^{j\phi_s(t)} = s_I(t) + js_Q(t)$$

$$y(t) = |y(t)|e^{j\phi_y(t)} = y_I(t) + jy_Q(t)$$

$$n(t) = |n(t)|e^{j\phi_n(t)} = n_I(t) + jn_Q(t).$$

The amplitude and phase modulations are related to the quadrature components by $$|s(t)| = \sqrt{s_I^2(t) + s_Q^2(t)} \quad \phi_s(t) = \tan^{-1}\frac{s_Q(t)}{s_I(t)}$$

$$|y(t)| = \sqrt{y_I^2(t) + y_Q^2(t)} \quad \phi_y(t) = \tan^{-1}\frac{y_Q(t)}{y_I(t)}$$

$$|n(t)| = \sqrt{n_I^2(t) + n_Q^2(t)} \quad \phi_n(t) = \tan^{-1}\frac{n_Q(t)}{n_I(t)}.$$

Initially, s(t), y(t), and n(t) will be modeled as statistically independent complex Gaussian processes. Hence, the pairs of processes ($s_I(t)$, $s_Q(t)$), ($y_I(t)$, $Y_Q(t)$), and ($n_I(t)$, $n_Q(t)$) will be individually modeled as jointly Gaussian processes. Attention is now focused on the clutter model.

Clutter Model

For ease in obtaining a state-space representation of the clutter, the clutter power spectral density will be modeled as an all-pole spectrum. This is equivalent to modeling y(t), the complex envelope of the clutter, as an autoregressive (AR) process. In particular, it is assumed that $$y(t) = -\sum_{k=1}^{P} a_k y(t-k) + \mu(t)$$

where $\mu(t)$ is a sample from a stationary zero-mean white Gaussian noise process with autocorrelation sequence $$r_{\mu\mu}(l) = \begin{cases} |\mu(t)|^2 = \sigma_\mu^2 & ; \; l = 0 \\ 0 & ; \; l \neq 0 \end{cases}$$

By definition, $$r_{\mu\mu}(l) = E[\mu(t)\mu^*(t-l)].$$

Rewriting the difference equation as $$y(t) + \sum_{k=1}^{P} a_k y(t-k) = \mu(t),$$

y(t) can be viewed as the outout sequence of a discrete-time linear filter with input sequence $\mu(t)$. For deterministic processes, the z-transform of the difference equation is $$Y(z) + \sum_{k=1}^{P} a_k z^{-k} Y(z) = U(z).$$

Therefore, the system function for the AR process is $$H(z) = \frac{Y(z)}{U(z)} = \frac{1}{1 + \sum_{k=1}^{P} a_k z^{-k}}.$$

P is referred to as the order of the AR process. Let the autocorrelation sequence of y(t) to denoted by $$r_{yy}(l) = E[y(t)y^*(t-l)].$$

The z-transforms of the autocorrelation sequences $r_{yy}(l)$ and $r_{\mu\mu}(l)$, respectively, are given by $$P_{yy}(z) = \sum_{l=-\infty}^{\infty} r_{yy}(l)z^{-l}$$

$$P_{\mu\mu}(z) = \sum_{l=-\infty}^{\infty} r_{\mu\mu}(l)z^{-l} = \sigma_\mu^2.$$

These two transforms are related by $$P_{yy}(z) = H(z)H^*\left(\frac{1}{z^*}\right)P_{\mu\mu}(z).$$

Let the pulse repetition interval of the radar be denoted by $T_s$. The power spectral density of the output sequence y(t) is defined to be $$P_{yy}(\omega) = T_s P_{yy}(z)\big|_{z=e^{j\omega T_s}} = T_s H(e^{j\omega T_s})H^*(e^{j\omega T_s})P_{\mu\mu}(e^{j\omega T_s})$$

$$= T_s |H(e^{j\omega T_s})|^2 \sigma_\mu^2 = \frac{T_s \sigma_\mu^2}{\left|1 + \sum_{k=1}^{P} a_k e^{-jk\omega T_s}\right|^2}.$$

A relationship is now developed between the autocorrelation sequence and the AR model parameters $a_k$. From the AR model.

$$y(t) = -\sum_{k=1}^{P} a_k y(t-k) + \mu(t).$$

Multiplying by $y^*(t-1)$ and taking the expected value results in $$E[y(t)y(t-1)] = -\sum_{k=1}^{P} a_k E[y(t-k)y^*(t-1)] + E[\mu(t)y^*(t-1)].$$

Assuming stationarity, the above equation becomes $$r_{yy}(1) = -\sum_{k=1}^{P} a_k r_{yy}(1-k) + r_{\mu y}(1).$$

Because $$Y(z) = H(z)\,U(z),$$

it follows that $$y(t) = \sum_{k=-\infty}^{\infty} h(k)\,\mu(t-k).$$

The impulse response sequence $h(k)$ can be determined by carrying out the division in $$H(z) = \frac{1}{1 + \sum_{k=1}^{P} a_k z^{-k}}.$$

Specifically, we have $$1 + a_1 z^{-1} + a_2 z^{-2} + \ldots + a_p z^{-P}) \overline{1} \quad \frac{1 - a_1 z^{-1} + (a_1^2 - a_2) z^{-2} + \ldots - a_1 z^{-1} - a_1^2 z^{-2} - \ldots - a_1 a_{P-1} z^{-P} - a_1 a_P z^{-P-1}}{\frac{1 + a_1 z^{-1} + a_2 z^{-2} + \ldots + a_P z^{-P}}{-a_1 z^{-1} - a_2 z^{-1} - \ldots - a_P z^{-P}} (a_1^2 - a_2) z^{-2} + \ldots + (a_1 a_{P-1} - a_P) z^{-P} + a_1 a_P z^{-P-1}}$$

By definition, $$H(z) = \sum_{k=-\infty}^{\infty} h(k) z^{-k}.$$

Comparison of this series with the result obtained from long division yields $$h(k) = 0;\ k < 0$$
$$h(o) = 1$$
$$h(1) = -a_1$$
$$h(2) = (a_1^2 - a_2)$$
$$\cdots\cdots\cdots\cdots$$

Note that $$y(t-1) = \sum_{k=o}^{\infty} h^*(k)\,\mu^*(t-1-k).$$

Consequently $$r_{\mu y}(1) = E[\mu(t)y^*(t-1)] = \sum_{k=o}^{\infty} h^*(k) E[\mu(t)\mu^*(t-1-k)].$$

Because $\mu(t)$ is a white noise process.

$$E[\mu(t)\mu^*(t-1-k)] = \begin{cases} \sigma_\mu^2;\ k = -1 \\ o;\ k \neq -1. \end{cases}$$

Therefore, the expression for $r_{82\,y}(1)$ simplifies to $$r_{\mu y}(1) = h^*(-1)\sigma_\mu^2.$$

Substituting into the expression for $r_{yy}(1)$ we obtain $$r_{yy}(1) = \sum_{k=1}^{\infty} a_k r_{yy}(1-k) + h^*(-1)\sigma_\mu^2.$$

We now consider several cases for the lag 1.

$$1 = 0$$

$$r_{yy}(0) = -\sum_{k=1}^{P} a_k\, r_{yy}(-k) + h^*(0)\sigma_\mu^2.$$

From the previous page $h(0) = 1$. Hence, $h^*(0) = 1$. Also, note that $$r_{yy}(-k) = E[y(t)y^*(t+k)] = [E[y(t+k)y^*(t)]]^* = r_{yy}^*(k).$$

It follows that $$r_{yy}(o) = -\sum_{k=1}^{P} a_k\, r_{yy}^*(k) + \sigma_\mu^2.$$

$$1 > 0$$

From the previous discussion, $h(-1) = 0$ for $1 > 0$. Hence, $h^*(-1) = 0$ for $1 > 0$. It follows that $$r_{yy}(1) = -\sum_{k=1}^{P} a_k\, r_{yy}(1-k);\ 1 > 0.$$

For $1 < 0$

Having determined $r_{yy}(1)$ for $1 < 0$, one can obtain $r_{yy}(1)$ for $1 > 0$ by using the relationship $$r_{yy}(1) = r_{yy}^*(-1).$$

Consider the case for which $1 = n + P > 0$. Then $$r_{yy}(n+P) + a_1 r_{yy}(n+P-1) + a_2 r_{yy}(n+P-2) + \ldots + a_{P-1} r_{yy}(n+1) + a_P r_{yy}(n) = 0.$$

This is a homogeneous difference equation of order P in the autocorrelation sequence $r_{yy}(n)$. It can be shown that $$r_{yy}(n) = \beta^n$$

is a solution of the homogensous difference equation provided $\beta$ is a root of the characteristic equation $$\beta^P + a_1\beta^{P-1} + \ldots + a_{P-1}\beta + a_P = 0.$$

Let the P roots of the above equation be denoted by $$\beta_1, \beta_2, \ldots, \beta_P.$$

The total homogeneous solution of the difference equation for $r_{yy}(n)$ is $$r_{yy}(n) = c_1\beta_1^n + c_2\beta_2^n + \ldots + c_P\beta_P^n.$$

The unknown coefficients are determined by specifying P initial conditions. For example, we could specify the values for $r_{yy}(0), r_{yy}(1), \ldots, r_{yy}(P=1)$ and set up P simultaneous equations in the unknowns $c_1, c_2, \ldots, c_P$.

To determine the AR model parameters $a_1, a_2, \ldots, a_P, \sigma_\mu^2$, $(P+1)$ equations in the $(P+1)$ unknowns are needed. Evaluating the expressions for $r\eta_{yy}(1)$ with $1 = 0, 1, 2, \ldots, P$, we have

$$r_{yy}(0) + a_1 r_{yy}^*(1) + \ldots + a_P r_{yy}^*(P) = \sigma_\mu^2$$
$$r_{yy}(1) + a_1 r_{yy}(0) + \ldots + a_P r_{yy}^*(P-1) = 0$$
$$\ldots\ldots\ldots\ldots\ldots\ldots\ldots\ldots\ldots\ldots\ldots$$
$$r_{yy}(P) + a_1 r_{yy}(0) + \ldots + a_P r_{yy}(0) = 0.$$

In matrix form the above equations become $$\begin{bmatrix} r_{yy}(0) & r_{yy}^*(1) & \ldots & r_{yy}^*(P) \\ r_{yy}(1) & r_{yy}(0) & \ldots & r_{yy}^*(P-1) \\ \vdots & & & \vdots \\ r_{yy}(P) & r_{yy}(P-1) & \ldots & r_{yy}(0) \end{bmatrix} \begin{bmatrix} 1 \\ a_1 \\ \vdots \\ a_P \end{bmatrix} \begin{bmatrix} \sigma_\mu^2 \\ 0 \\ \vdots \\ 0 \end{bmatrix}$$

These equations are known as the Yule-Walter normal equations.

In general, terms in the autocorrelation sequence $r_{yy}(1)$ must be estimated. Assuming ergodicity, ensemble averages can be replaced by equivalent temporal averages. As estimate which can be shown to lead to a positive definite autocorrelation matrix is given by $$v_{yy}(1) = \frac{1}{N} \sum_{n=0}^{N-1-1} y(n+1)y^*(n).$$

For implementation of the Kalman filter it is desirable to have a state-space representation of the clutter in the form $$\underline{F}(t) = \psi(t-1)\underline{F}(t-1) + \Gamma(t-1)\mu(t-1)$$
$$y(t) = H(t)\underline{F}(t) + \mu(t)$$

where $\underline{F}(t)$ is the state vector. Many different choices are possible for the state vector. By way of example, we develop two convenient canonical realizations.

CANONICAL REALIZATION #1

From the previous discussion, the AR process is modeled by $$y(t) = -\sum_{k=1}^{P} a_k y(t-k) + \mu(t).$$

In greater detail, $$y(t) = a_1 y(t-1) - a_2 y(t-2) - \ldots$$
$$a_{P-1} y(-P+1) - a_P y(t-P) + \mu(t).$$

Because this is a difference equation of order P, P state variables need to be chosen. For this purpose, define $$F_1(t) = y(t-P)$$
$$F_2(t) = y(t-P+1)$$
$$\vdots$$
$$F_{P-1}(t) = y(t-2)$$
$$F_P(t) = y(t-1).$$

This choice results in the following set of equations $$F_1(t) = F_2(t-1)$$
$$F_2(t) = F_3(t-1)$$
$$\vdots$$
$$F_{P-1}(t) = F_P(t-1)$$
$$F_P(t) = -a_1 y(t-2) - a_2 y(t-3) - \ldots -$$
$$a_{P-1} y(t-P) - a_P y(t-P-1) + \mu(t-1)$$
$$= -a_1 F_P(t-1) - a_2 F_{P-1}(t-1) - \ldots -$$
$$a_{P-1} F_2 4(t-1) - a_P F_1(t-1) + \mu(t-1).$$

In matrix form, this set of equations becomes $$\begin{bmatrix} F_1(t) \\ F_2(t) \\ \vdots \\ F_{P-1}(t) \\ F_P(t) \end{bmatrix} = \begin{bmatrix} 0 & 1 & 0 & \ldots & 0 \\ 0 & 0 & 1 & \ldots & 0 \\ \vdots & & & & \vdots \\ 0 & 0 & 0 & \ldots & 1 \\ -a_P & -a_{P-1} & -a_{P-2} & & -a_1 \end{bmatrix} \begin{bmatrix} F_1(t-1) \\ F_2(t-1) \\ \vdots \\ F_{P-1}(t-1) \\ F_P(t-1) \end{bmatrix} + \begin{bmatrix} 0 \\ 0 \\ \vdots \\ 0 \\ 1 \end{bmatrix} \mu(t-1).$$

The output equation is given by $$y(t) = -a_1 y(t-1) - a_2 y(t-1) - \ldots -$$
$$a_{P-1} y(t-P+1) - a_P y(t-P) + \mu(t)$$
$$= -a_1 F_P(t) - a_2 F_{P-1}(t) - \ldots -$$
$$a_{P-1} F_2(t) - a_P F_1(t) + \mu(t).$$

By comparison with the matrix form of the state-space representation given above, if follows that $$\psi(t-1) = \begin{bmatrix} 0 & 1 & 0 & \ldots & 0 \\ 0 & 0 & 1 & \ldots & 0 \\ \cdots & \cdots & \cdots & & \cdots \\ 0 & 0 & 0 & \ldots & 1 \\ -a_P & -a_{P-1} & -a_{P-2} & & -a_1 \end{bmatrix}$$

$$\Gamma(t-1) = \begin{bmatrix} 0 \\ 0 \\ -- \\ 0 \\ 1 \end{bmatrix}$$

$$H(t) = [-a_P \; -a_{P-1} \ldots -a_2 \; -a_1].$$

CANONICAL REALIZATION #2

A second form of the state-space model is known as the observer canonical realization. Once again, we begin with the difference equation for the AR process:

$$y(t) = -\sum_{k=1}^{P} a_k \, y(t-k) + \mu(t).$$

Define the $P^{th}$ state variable to be $$F_P(t) = -\sum_{k=1}^{P} a_k \, y(t-k).$$

Also, define the $(P-1)^{th}$ state variable to be $$F_{P-1}(t) = -\sum_{k=2}^{P} a_k \, y(t-k+1).$$

The $P^{th}$ state variable can then be written as $$F_P(t) = -a_1 y(t-1) + F_{P-1}(t-1).$$

Noting that $$y(t) = F_P(t) + \mu(t).$$

it follows that $$y(t-1) = F_P(t-1) + \mu(t).$$

Consequently, the expression for $F_P(t)$ becomes $$F_P(t) = -a_1 F_P(t-1) - a_1 \mu(t-1) + F_{P-1}(t-1).$$

A similar procedure is used to develop an expression for $F_{P-1}(t)$. Separating out the first term in the expression at the bottom of the previous page for $F_{P-1}(t)$, we have $$F_{P-1}(t) = -a_2 \, y(t-1) - \sum_{k=3}^{P} a_k \, y(t-k+1).$$

Define the $(P-2)^{th}$ state variable to be $$F_{P-2}(t) = -\sum_{k=3}^{P} a_k \, y(t-k+2).$$

Then $$F_{P-1}(t) = -a_2 \, y(t-1) + F_{P-2}(t-1) =$$
$$-a_2 F_P(t-1) - a_2 \mu(t-1) + F_{P-2}(t-1).$$

The expression for $F_{P-2}(t)$ is obtained in an analogous fashion.

$$F_{P-2}(t) = -a_3 \, y(t-1) - \sum_{k=4}^{P} a_k \, y(t-k+2).$$

Define the $(P-3)^{th}$ state variable to be $$F_{P-3}(t) = -\sum_{k=4}^{P} a_k \, y(t-k+3).$$

It follows that $$F_{P-2}(t) = -a_3 \, y(t-1) + F_{P-3}(t-1)$$
$$= -a_3 F_P(t-1) - a_3 \mu(t-1) + F_{P-3}(t-1).$$

Proceeding in like fashion $$F_2(t) = F_{P-(P-2)}(t) = -a_{P-1} \, y(t-1) -$$
$$\sum_{k=P}^{P} a_k \, y(t-k+P-2).$$
$$= -a_{P-1} \, y(t-1) - a_P \, y(t-2).$$

Define the $1^{st}$ state variable to be $$F_1(t) = -a_P \, y(t-1).$$

Then $$F_2(t) = -a_{P-1} \, y(t-1) + F_1(t-1)$$
$$= -a_{P-1} F_P(t-1) - a_{P-1} \mu(t-1) + F_1(t-1).$$

Finally, note that $$F_1(t) = -a_P F_P(t-1) - a_P \mu(t-1).$$

The equations for the state variables are now written collectively as shown below:

$$F_1(t) = -a_P F_P(t-1) - a_P \mu(t-1)$$
$$F_2(t) = F_1(t-1) - a_{P-1} F_P(t-1) - a_{P-1} \mu(t-1)$$
$$\cdots$$
$$F_{P-2}(t) = F_{P-3}(t-1) - a_3 F_P(t-1) - a_3 \mu(t-1)$$
$$F_{P-1}(t) = F_{P-2}(t-1) - a_2 F_P(t-1) - a_2 \mu(t-1)$$
$$F_P(t) = F_{P-1}(t) - a_1 F_P(t-1) - a_1 \mu(t-1).$$

In matrix form, the set of equations can be written as:

$$\begin{bmatrix} F_1(t) \\ F_2(t) \\ \cdots \\ F_{P-1}(t) \\ F_P(t) \end{bmatrix} = \begin{bmatrix} 0 & 0 & \ldots & 0 & 0 & -a_P \\ 1 & 0 & \ldots & 0 & 0 & -a_{P-1} \\ - & \cdots & & \cdots & & \cdots \\ 0 & 0 & \ldots & 1 & 0 & -a_2 \\ 0 & 0 & \ldots & 0 & 1 & -a_1 \end{bmatrix} \begin{bmatrix} F_1(t-1) \\ F_2(t-1) \\ \cdots \\ F_{P-1}(t-1) \\ F_P(t-1) \end{bmatrix} +$$

$$\begin{bmatrix} -a_P \\ -a_{P-1} \\ \cdots \\ -a_2 \\ -a_1 \end{bmatrix} \mu(t-1)$$

From the previous discussion, the observation is given by $$y(t) = F_1(t) + \mu(t).$$

In matrix form, this becomes $$y(t) = [0\ 0\ \ldots\ 1]\begin{bmatrix} F_1(t) \\ F_2(t) \\ \cdots \\ F_P(t) \end{bmatrix} + \mu(t)$$

By comparison with $$F(t) = \psi(t-1)F(t-1) + \Gamma(t-1)\mu(t-1)$$

$$y(t) = H(t)F(t) + \mu(t),$$

it follows that $$\psi(t-1) = \begin{bmatrix} 0 & 0 & \ldots & 0 & 0 & -a_P \\ 1 & 0 & \ldots & 0 & 0 & -a_{P-1} \\ \cdot & \cdots & & \cdots & & \cdots \\ 0 & 0 & \ldots & 1 & 0 & -a_2 \\ 0 & 0 & \ldots & 0 & 1 & -a_1 \end{bmatrix} \Gamma(t-1) = \begin{bmatrix} -a_P \\ -a_{P-1} \\ \cdots \\ -a_2 \\ -a_1 \end{bmatrix}$$

$$H(t) = [0\ 0\ \ldots\ 1].$$

2. Kalman Filter—State-Space Model Considerations

Adding observation noise $q(t)$, the observed data has the state-space representation $$F(t) = \psi(t-1)F(t-1) + \Gamma(t-1)\mu(t-1)$$

$$y(t) = H(t)F(t) + \mu(t) + q(t).$$

$\mu(t)$ and $q(t)$ are assumed to be zero-mean white noise sequences with variances $$R_{\mu\mu}(t) = E[|\mu(t)|^2] = \sigma_\mu^2(t)$$

and $$R_{qq}(t) = E[|q(t)|^2] = \sigma_q^2(t).$$

Because $\mu(t)$ and $q(t)$ are white, $$R_{\mu\mu}(k,j) = E[\mu(k)\mu^*(j)] = \sigma_\mu^2(k)\delta_{jk}$$

$$R_{qq}(k,j) = E[q(k)q^*(j)] = \sigma_q^2(k)\delta_{jk}$$

where $\delta_{jk}$ is the Kronecker delta function defined by $$\delta_{jk} = \begin{cases} 1; j = k \\ 0; j \neq k. \end{cases}$$

In addition, $\mu(t)$ and $q(t)$ are assumed to be statistically independent noise sequences. Thus, $$R_{\mu q}(k,j) = E[\mu(k)q^*(j)] = 0$$

for all choices of k and j.

The classical development of the Kalman filter assumes the state-space representation of the observed data to be in the form $$\begin{aligned} x(t) &= A(t-1)x(t-1) + \omega(t-1)w(t-1) \\ y(t) &= c(t)x(t) + v(t) \end{aligned}$$

where $\underline{x}(t)$ is the state vector and $\underline{w}(t)$ and $\underline{v}(t)$ are statistically independent white-noise sequences such that $$R_{wv}(k,j) = E[w(k)v^H(j)] = 0$$

for all choices of j and k. In the state-space representation at the top of the previous page.

$$w(t) = \mu(t)$$

$$v(t) = \mu(t) + q(t).$$

Clearly, $\underline{w}(t)$ and $\underline{v}(t)$ are not statistically independent. We now show how to overcome this difficulty.

From the top of the previous page, $$F(t) = \psi(t-1)F(t-1) + \Gamma(t-1)\mu(t-1)$$

$$y(t) = H(t)F(t) + \mu(t) + q(t).$$

Let $$n(t) + \mu(t) + q(t).$$

Also, assume $\mu(t)$ can be decomposed such that $$\mu(t) = h(t) + B\ n(t).$$

The constant B is chosen such that $$R_{hn}(k) = E[h(k)n^*(k)] = 0.$$

Substituting for $h(k)$ in the above equation, $$E[[\mu(k) - B\ n(k)]n^*(k)] = E[\mu(k)n^*(k)] - B\ E[|n(k)|^2] = 0.$$

Thus, $$B = \frac{E[\mu(k)n^*(k)]}{E[|n(k)|^2]} = \frac{R_{\mu n}(k)}{\sigma_n^2(k)}.$$

Also, note that $$R_{hh}(k) = E[|h(k)|^2] = E[[\mu(k) - B\ n(k)][\mu(k) - B\ n(k)]^*]$$

$$E[|\mu(k)|^2] - B\ E[n(k)\mu^*(k)] - B^* E[\mu(k)n^*(k)] + |B|^2 E[|n(k)|^2].$$

Hence, $$R_{hh}(k) = \sigma_\mu^2(k) - 2Re[B^* R_{\mu n}(k)] + |B|^2 \sigma_2^2(k).$$

Evaluating $R_{\mu n}(k)$, we obtain $$R_{\mu n}(k) = E[\mu(k)n^*(k)] = E(\mu(k)[\mu(k) + q(k)]^*)$$
$$= E[|\mu(k)|^2] + R_{\mu q}^0(k) = \sigma_\mu^2(k).$$

It follows that $B = \sigma_\mu^2(k)/\sigma_n^2(k)$. Therefore, $$R_{hh}(k) = \sigma_\mu^2(k) - 2\frac{\sigma_\mu^2(k)}{\sigma_n^2(k)}\sigma_\mu^2(k) + \left[\frac{\sigma_\mu^2(k)}{\sigma_n^2(k)}\right]^2 \sigma_n^2(k)$$

$$= \sigma_\mu^2(k) - \frac{\sigma_\mu^4(k)}{\sigma_n^2(k)} = \frac{\sigma_\mu^2(k)\sigma_n^2(k) - \sigma_\mu^4(k)}{\sigma_n^2(k)}.$$

However, $$\sigma_n^2(k) = E[|n(k)|^2] = E[|\mu(k) + q(k)|^2] = \sigma_\mu^2(k) + \sigma_q^2(k).$$

Thus, $R_{hh}(k)$ simplifies to $$R_{hh}(k) = \frac{\sigma_\mu^2(k)\sigma_q^2(k)}{\sigma_\mu^2(k) + \sigma_q^2(k)}.$$

Define an augmented state vector to be $$x(t) = \begin{bmatrix} F(t) \\ n(t) \end{bmatrix}.$$

Substituting for $F(t)$, we have $$x(t) = \begin{bmatrix} \psi(t)F(t-1) + \Gamma(t-1)\mu(t-1) \\ n(t) \end{bmatrix}$$

$$= \begin{bmatrix} \psi(t-1)F(t-1) + \Gamma(t-1)[h(t-1) + Bn(t-1)] \\ n(t) \end{bmatrix}.$$

Simplifying further, we have $$x(t) = \begin{bmatrix} \psi(t-1)F(t-1) + \Gamma(t-1)Bn(t-1) \\ 0 \end{bmatrix} +$$

$$\begin{bmatrix} \Gamma(t-1)h(t-1) \\ n(t) \end{bmatrix}$$

$$= \begin{bmatrix} \psi(t-1) & \Gamma(t-1)B \\ \text{-----} & \text{-----} \\ [00\ldots0] & 0 \end{bmatrix} \begin{bmatrix} F(t-1) \\ n(t-1) \end{bmatrix} +$$

$$\begin{bmatrix} \Gamma(t-1) & 0 \\ \text{-----} & \text{-----} \\ 0 & 1 \end{bmatrix} \begin{bmatrix} h(t-1) \\ \text{---} \\ n(t) \end{bmatrix}.$$

The observation is given by $$y(t) = H(t)F(t) + n(t)$$
$$= [H(t) \quad 1]\begin{bmatrix} F(t) \\ n(t) \end{bmatrix}.$$

Therefore, using the augmented state vector, we have $$x(t) = A(t-1)x(t-1) + \omega(t-1)w(t-1)$$

$$y(t) = c(t)x(t) + v(t)$$

where $$x(t) = \begin{bmatrix} F(t) \\ n(t) \end{bmatrix}; w(t) = \begin{bmatrix} h(t) \\ n(t+1) \end{bmatrix}; v(t) = 0$$

$$A(t-1) = \begin{bmatrix} \psi(t-1) & \Gamma(t-1)B \\ \text{-----} & \text{-----} \\ [00\ldots0] & 0 \end{bmatrix};$$

$$\omega(t-1) = \begin{bmatrix} \Gamma(t-1) & 0 \\ \text{-----} & \text{-----} \\ 0 & 1 \end{bmatrix}; c(t) = [H(t) \quad 1].$$

We now show that the process $\underline{w}(t)$ is a white noise sequence. This follows because $\mu(t)$ and $n(t) = \mu(t) + q(t)$ are individually white noise sequences and, therefore, so also is $h(t) = \mu(t) - B n(t)$. Furthermore, $h(k)$ is uncorrelated with $n(j)$ for all choices of j and k. Specifically, $R_{ww}(k,j)$ is given by $$R_{ww}(k,j) = E[w(k)w^H(j)] = E\left(\begin{bmatrix} h(k) \\ n(k+1) \end{bmatrix}[h(j)n^*(j+1)]\right) =$$

$$\begin{bmatrix} R_{hh}(k,j) & R_{hn}(k,j+1) \\ R_{nh}(k+1,j) & R_{nn}(k+1,j+1) \end{bmatrix} = \begin{bmatrix} \sigma_h^2\delta_{jk} & 0 \\ 0 & \sigma_n^2\delta_{jk} \end{bmatrix} =$$

$$c(t)(m_x(t) + R_{xd}(t,t-1)R_{dd}^{-1}(t-1)[d(t-1) - m_d(t-1)]) =$$

$$c(t)x(t:t-1).$$

Note that $E[\underline{x}(t \ t)] = E[\underline{x}(t \ t-1)] = \underline{m}_x(t)$. Hence, $$E[y(t \ t)] = c(t)E[x(t \ t-1)] = c(t) m_x(t).$$

Therefore, $x(t \ t)$, $x(t \ t-1)$, and $y(t \ t-1)$ are all unbiased estimators. Using the above results, the innovations process can be expressed as $$e(t) = y(t) - y(t \ t-1) = c(t)x(t) - c(t)x(t \ t-1)$$

$$c(t)[x(t) - x(t \ t-1)] = c(t)\epsilon_x(t \ t-1).$$

The innovations process has several useful properties. Three of these are now derived.

1. $e(t)$ is a zero-mean sequence.

PROOF $$E[e(t)] = E[y(t)] - E[y(t \ t-1)] = m_y(t) - m_y(t) = 0.$$

2. $e(t)$ is a white sequence (i.e., $R_e(t,k) = R_e(t)\delta_{tk}$).

PROOF

The covariance matrix of $e(t)$ is given by $$R_e(t, k) = E[e(t)e^H(k)] = E(c(t)\epsilon_x(t\ t - 1)\epsilon_x^H(k\ k - 1)c^H(k)) = $$
$$c(t)E[\epsilon_x(t\ t - 1)\epsilon_x^H(k\ k - 1)]c^H(k).$$

Case 1: k=t
Define the error covariance matrix to be $$P(t\ t-1) = E[\epsilon_x(t\ t-1)\epsilon_x^H(t\ t-1)].$$

We conclude that $$R_e(t,t) = c(t)P(t\ t-1)c^H(t).$$

Case 2: k<t
Since $$x(k\ k-1) = m_x(k) + R_{xd}(k, k-1)R_{dd}^{-1}(k-1)[d(k-1) - m_d(k-1)]$$

where $$d(k-1) = [y(1)y(2) \ldots y(k-1)].$$

it follows that $$R_e(t, k) = c(t)E[\epsilon_x(t\ t - 1)[x(k) - m_k(k)]^H]c^H(k) - $$
$$c(t)E[\epsilon_x(t\ t - 1)[d(k - 1) - m_d(k - 1)]^H]R_{dd}^{-1}(k - 1)R_{dx}(k, k - 1)c^H(k).$$

From the orthogonally condition, $$E[\epsilon_x(t\ t-1)[d(k-1) - m_d(k-1)]^H] = [0].$$

Also, $$y(k) - m_y(k) = c(k)x(k) - c(k)m_x(k) = c(k)[x(k) - m_x(k)].$$

Therefore, $$[y(k) - m_y(k)]^H = [x(k) - m_x(k)]^H c^H(k).$$

It follows that $$E[\epsilon_x(t\ t-1)[x(k) - m_x(k)]^H]c^H(k) = E[\epsilon_x(t\ t-1)[y(k) - m_y(k)]^H]$$

Noting that k<t, the orthogonally condition yields $$E[\epsilon_x(t\ t-1)[y(k) - m_y(k)]^H][0].$$

We conclude that $$R_e(t,k) = 0$$

for k<t.
Case 3: k>t $$R_e(t, k) = c(t)E[\epsilon_x(t\ t - 1)\epsilon_x^H(k\ k - 1)]c^H(k) = $$
$$c(t)E([x(t) - x(t\ t - 1)]\epsilon_x^H(k\ k - 1))c^H(k).$$

Since $$x(t\ t-1) = m_x(t) + R_{xd}(t,t-1)R_{dd}^{-1}(t-1)[d(t-1) - m_d(t-1)],$$

where $$d^T(t-1) = [y(1)y(2) \ldots y(t-1)],$$

it follows that $$R_e(t, k) = c(t)E[[x(t) - m_x(t)]\epsilon_x^H(k\ k - 1)])c^H(k) - $$
$$c(t)R_{xd}(t, t - 1)R_{dd}^{-1}(t - 1)E([d(t - 1) - m_d(t - 1)]\epsilon_x^H(k\ k - 1))c^H(k).$$

Because k>t, the orthogonality condition yields $$E[[d(t-1) - m_d(t-1)]\epsilon_x^H(k\ k-1)] = [0].$$

Also, from the earlier discussion, $$c(t)[x(t) - m_x(t)] = y(t) - m_y(t).$$

Hence, $$c(t)E[[x(t) - m(t)]\epsilon_x^H(k\ k - 1)] = E[[y(t) - m_y(t)]\epsilon_x^H(k\ k - 1)].$$

Again, Since k<t, the orthogonality condition results in $$E[[y(t) - m_y(t)]\epsilon_x^H(k\ k-1)] = [0].$$

We conclude that $$R_e(t,k) = 0 \text{ for } k > t$$

In summary, we have $$R_e(t,k) = \begin{cases} c(t)\ P(t\ t - 1)\ c^H(t); & t = k \\ 0; & t \neq k. \end{cases}$$

If we define $$R_e(t) = R_e(t,t) = c(t)P(t\ t-1)c^H(t),$$

$R_e(t,k)$ can be expressed as $$R_e(t,k) = R_e(t)\delta_{tk}.$$

We conclude that the innovations is a white sequence.
3. e(t) is orthogonal to the data prior to time t

PROOF

Let $\underline{d}^T(T_o) = [y(1)y(2) \ldots y(T_o)]$. Assume $$T_o \leq t-1.$$

Thus, $\underline{d}(T_o)$ consists of data prior to time t. Consider $$\text{Cov}[d(T_o), e(t)] = E[[d(T_o) - m_d(T_o)]e(t)].$$

By definitions, $$e(t) = y(t) - y(t\ t-1) = c(t)\epsilon_x(t\ t-1).$$

Thus, $$\text{Cov}[d(T_o), e(t)] = E[[d(T_o) - m_d(T_o)]\epsilon_x^H(t\ t-1)]c^H(t).$$

From the orthogonality condition $$E[[d(T_o) - m_d(T_o)]\epsilon_x^H(t\ t-1)] = [0].$$

It follows that $$\text{Cov}[d(T_o), e(t)] = [0].$$

We see that the innovations process at time t is orthogonal to the data prior to time t.

It is noted that the three properties derived for the innovations sequence were obtained without invoking the Gaussian assumption.

Having introduced the innovations sequence, we return to the objective of determining a recursive form for the estimator. Recall that $$x(t\ t) = m_x(t) + R_{xd}(t) R_{dd}^{-1}(t)[d(t) - m_d(t)]$$

where, $$d^T(t) = [y(1) y(2) \ldots y(t)]$$

is a (tx1) dimensional vector, $$x^T(t\ t) = [x_1(t\ t) x_2(t\ t) \ldots x_P(t\ t) n(t\ t)].$$

is a ((P+1)x1) dimensional vector and $n(t) = \mu(t) + q(t)$ is the total observation noise in the original state-space representation, $$R_{xd}(t) = E[[x(t) - m_x(t)][d(t) - m_d(t)]^H]$$

is a ((P+1)x t) dimensional matrix, and $$R_{dd}(t) = E[[d(t) - m_d(t)][d(t) - m_d(t)]^H]$$

is a (txt) dimensional matrix.

Using the Gram-Schmidt procedure, it is now shown that it is possible to find a matrix L such that $$d(t) - m_d(t) = L\ e$$

where $$e^T = [e(1) e(2) \ldots e(t)].$$

The Gram-Schmidt procedure begins by requiring that $$e(1) = y(1) - m(1).$$

Since, by definition, $$e(1) = y(1) - y(1\ 0),$$

this amounts to selecting the initial estimate to be $$y(1\ 0) = m_y(1).$$

This is a reasonable choice because, in the absence of data, it makes sense to use the mean value as the estimate.

The second step is to represent e(2) as $$e(2) = y(2) - m_y(2) - L_{21} e(1).$$

$L_{21}$ is determined by requiring that $$E[e(2)e^*(1)] = \underbrace{E([y(2) - m_y(2)]e^*(1))}_{R_{ye}(2,1)} - L_{21} \underbrace{E[|e(1)|^2]}_{R_e(1)} = 0.$$

$$\therefore R_{ye}(2,1) = L_{21} R_e(1)$$

$$L_{21} = R_{ye}(2,1) R_e^{-1}(1).$$

The third step is to represent e(3) as $$e(3) = y(3) - m_y(3) - L_{31} e(1) - L_{32} e(2).$$

$L_{31}$ is determined by requiring that $$E[e(3)e^*(1)] = \underbrace{E([y(3) - m_y(3)]e^*(1))}_{R_{ye}(3,1)} - L_{31} \underbrace{E[|e(1)|^2]}_{R_e(1)} -$$

$$L_{32} \underbrace{E[e(2)e^*(1)]}_{R_2(2,1)} = 0.$$

Because the innovations process is white, $$R_e(2,1) = 0.$$

Hence, $$R_{ye}(3,1) = L_{31} R_e(1)$$

$$L_{31} = R_{ye}(3,1) R_e^{-1}(1).$$

Similarly, $L_{32}$ is determined by requiring that $$E[e(3)\ e^*(2)] = \underbrace{E[[y(3) - m_y(3)]e^*(2)]}_{R_{ye}(3,2)} - L_{31} \underbrace{E[e(1)\ e^*(2)]}_{R_e(1,2)} -$$

$$L_{32} \underbrace{E[|e(2)|^2]}_{R_e(2)} = 0$$

Because the innovations process is white, $$R_e(1,2) = 0.$$

Hence, $R_{ye}(3,2) = L_{32} R_e(2)$ $$L_{32} = R_{ye}(3,2) R_e^{-1}(2).$$

Proceeding in a similar manner, it can be shown that the innovations at time t is given by $$e(t) = y(t) - m_y(t) - L_{t1} e(1) - L_{t2} e(2) - \ldots -$$

$$L_{t,t-1} e(t-1) = y(t) - m_y(t) - \sum_{i=1}^{t-1} L_{ti} e(i) \text{ where}$$

$$L_{ti} = R_{ye}(t,i) R_e^{-1}(i).$$

In summary, the Gram-Schmidt procedure yields the following equations:

$$e(1) = y(1) - m_y(1)$$

$$e(2) = y(2) - m_y(2) - L_{21} e(1)$$

$$e(3) = y(3) - m_y(3) - L_{31} e(1) - L_{32} e(2)$$

-continued $$e(t) = y(t) - m_y(t) - L_{t1} e(1) - L_{t2} e(2) - \ldots - L_{t,t-1} e(t-1).$$

These equations can be rewritten as $$y(1) = m_y(1) - e(1)$$

$$y(2) - m_y(2) = L_{21} e(1) + e(2)$$

$$y(3) - m_y(3) = L_{31} e(1) - L_{32} e(2) + e(3)$$

$$y(t) - m_y(t) = L_{t1} e(1) + L_{t2} e(2) + \ldots + L_{t,t-1} e(t-1) + e(t).$$

Recall that $$d^T(t) = [y(1) y(2) \ldots y(t)]$$

$$m_d(t) = [m_y(1) m_y(2) \ldots m_y(t)].$$

Define the matrix $$\begin{bmatrix} 1 & 0 & 0 & \ldots & 0 \\ L_{21} & 1 & 0 & \ldots & 0 \\ L_{31} & L_{32} & 1 & \ldots & 0 \\ \ldots & \ldots & \ldots & \ldots & \ldots \\ L_{t,1} & L_{t,2} & L_{t,3} & \ldots & 1 \end{bmatrix}.$$

It follows that the data can be expressed in terms of the innovations according to the relation $$d(t) - m_d(t) = L\, e.$$

Because the innovations process is defined to be $$e(t) = y(t) - y(t\,|\,t-1)$$

and because we have shown that $$e(t) = y(t) - m_y(t) - \sum_{i=1}^{t-1} L_{ti}\, e(i)$$

where
$$L_{ti} = R_{ye}(t,i) R_e^{-1}(i),$$

it can be concluded that $$y(t\,|\,t-1) = m_y(t) + \sum_{i=1}^{t-1} L_{ti}\, e(i).$$

Having expressed the data in terms of the innovations, we return to the objective of obtaining a recursive form for the estimator. As pointed out previously, $$x(t\,|\,t) = m_x(t) + R_{xd}(t)\, R_{dd}^{-1}(t)[d(t) - m_d(t)].$$

However, $$R_{dd}(t) = E([d(t) - m_d(t)][d(t) - m_d(t)]^H) = L\, \underbrace{E[e\, e^H]}_{R_e}\, L^H.$$

Thus, $$R_{dd}^{-1}(t) = (L^H)^{-1} R_e^{-1} L^{-1}$$

where
$$R_e = E[e\, e^H].$$

-continued

Similarly, $$\begin{aligned} R_{xd}(t) &= E([x(t) - m_x(t)][d(t) - m_d(t)]^H) \\ &= \underbrace{E([x(t) - m_x(t)]\, e^H)}_{R_{xe}}\, L^H = R_{xe}\, L^H. \end{aligned}$$

It follows that $$\begin{aligned} x(t\,|\,t) &= m_x(t) + R_{xe}\, L^H\, (L^H)^{-1} R_e^{-1} L^{-1} L\, e \\ &= m_x(t) + R_{xe}\, R_e\, e. \end{aligned}$$

Note that $$R_{xe} = E[[x(t) - m_x(t)][e^*(1) - e(2) \ldots e^*(t)]^H].$$

Define $$R_{xe}(t,j) = E[[x(t) - m_x(t)] e^*(j)].$$

Then $$R_{xe} = [R_{xe}(t,1) R_{xe}(t,2) \ldots R_{xe}(t,t)].$$

Also, note that $$R_e = E[e\, e^H] = E\left( \begin{bmatrix} e(1) \\ e(2) \\ \ldots \\ e(t) \end{bmatrix} [e^*(1)\, e^*(2) \ldots e^*(t)] \right).$$

Define $$R_e(i,j) = E[e(i) e^*(j)].$$

Because the innovations is a white process, $$R_e(i,j) = 0 \text{ for } i \neq j.$$

For convenience, let $$R_3(i,j) = E[|e(i)|^2] = \sigma_e^2(i).$$

It follows that $$R_e = \begin{bmatrix} \sigma_e^2(1) & 0 & \ldots & 0 \\ 0 & \sigma_e^2(2) & & 0 \\ \ldots & \ldots & \ldots & \ldots \\ 0 & 0 & & \sigma_e^2(t) \end{bmatrix}.$$

The inverse of the diagonal matrix is simply given by $$(R_e)^{-1} = \begin{bmatrix} 1/\sigma_e^2(1) & 0 & \ldots & 0 \\ 0 & 1/\sigma_e^2(2) & & 0 \\ \ldots & \ldots & \ldots & \ldots \\ 0 & 0 & & 1/\sigma_e^2(t) \end{bmatrix}.$$

Utilizing the above results, the estimate becomes $$x(t\mid t) = m_x(t) + R_{xe} R_e^{-1} e$$

$$= m_x(t) + [R_{xe}(t,1)\ R_{xe}(t,2) \ldots R_{xe}(t,t)]$$

$$\begin{bmatrix} 1/\sigma_e^2(1) & 0 & \ldots & 0 \\ 0 & 1/\sigma_e^2(2) & & 0 \\ \vdots & \vdots & \ddots & \vdots \\ 0 & 0 & & 1/\sigma_e^2(t) \end{bmatrix} \begin{bmatrix} e(1) \\ e(2) \\ \vdots \\ e(t) \end{bmatrix}$$

$$= m_x(t) + [R_{xe}(t,1)\ R_{xe}(t,2) \ldots R_{xe}(t,t)]$$

$$\begin{bmatrix} e(1) & \sigma_e^2(1) \\ e(2) & \sigma_e^2(2) \\ \vdots & \vdots \\ e(t) & \sigma_e^2(t) \end{bmatrix}$$

$$= m_x(t) + \frac{R_{xe}(t,1)}{\sigma_e^2(1)} e(1) + \frac{R_{xe}(t,2)}{\sigma_e^2(2)} e(2) + \ldots + \frac{R_{xe}(t,t)}{\sigma_e^2(t)} e(t).$$

In closed form the estimate can be written as $$x(t\mid t) = m_x(t) + \sum_{i=1}^{(t)} \frac{R_{xe}(t,i)}{\sigma_e^2(i)} e(i).$$

Extracting the last term in the sum, we have $$x(t\mid t) = m_x(t) + \sum_{i=1}^{(t-1)} \frac{R_{xe}(t,i)}{\sigma_e^2(i)} e(i) + \frac{R_{xe}(t,t)}{\sigma_e^2(t)} e(t).$$

Repeating the previous analysis for the minimum mean-squared estimate of $\underline{x}(t)$ using data only up to time (t-1) reveals that $$x(t\mid t-1) = m_x(t) + \sum_{i=1}^{(t-1)} \frac{R_{xe}(t,i)}{\sigma_e^2(i)} e(i).$$

It follows that $$x(t\mid t) = x(t\mid t-1) + \frac{R_{xe}(t,t)}{\sigma_e^2(t)} e(t).$$

If the Kalman gain is defined to be $$K(t) = \frac{R_{xe}(t,t)}{\sigma_e^2(t)},$$

we than have $$x(t\mid t) = x(t\mid t-1) + K(t)e(t).$$

The Kalman gain is now expressed in terms of the error covariance matrix. By definition, $$R_{xe}(t,t) = E[[x(t) - m_x(t)]e^*(t)].$$

From the previous discussion, $$e(t) = c(t)\epsilon_x(t\mid t-1) = \epsilon_x^T(t\mid t-1)c^T(t).$$

Hence, $$e(t) = \epsilon_x^H(t\mid t-1)c^H(t).$$

It follows that $$R_{xe}(t,t) = E[[x(t) - m_x(t)]\epsilon_x^H(t\mid t-1)]c^H(t)$$

However, $$\epsilon_x(t\mid t-1) = x(t) - x(t\mid t-1).$$

Thus, $$x(t) = \epsilon_x(t\mid t-1) + x(t\mid t-1).$$

Substituting for $\underline{x}(t)$ in $\underline{R}_{xe}(t,t)$, we have $$R_{xe}(t,t) = E[[x(t\mid t-1) - m_x(t)]\epsilon_x^H(t\mid t-1)]c^H(t) + E[\epsilon_x(t\mid t-1)\epsilon_x(t\mid t-1)]c^H(t).$$

However, the error covariance matrix was defined $$P(t\mid t-1) = E[\epsilon(t\mid t-1) - \epsilon_x^H(t\mid t-1)].$$

Also, $$x(t\mid t-1) - m_x(t) = R_{xd}(t,t-1)R_{dd}^{-1}(t-1)[d(t-1) - m_d(t-1)].$$

Therefore, $$R_{xe}(t,t) = R_{xd}(t,t-1)R_{dd}^{-1}(t-1)E[[d(t-1) - m_d(t-1)]\epsilon_x^H(t\mid t-1)]c^H(t) + P(t\mid t-1)c^H(t).$$

From the orthogonality condition, $$E[[d(t-1) - m_d(t-1)]\epsilon_x^H(t\mid t-1)] = [0].$$

Hence, $$R_{xe}(t,t) = P(t\mid t-1)c^H(t).$$

We conclude that the Kalman gain can be expressed as $$K(t) = \frac{P(t\mid t-1)C^H(t)}{\sigma_e^2(t)}.$$

The next step is to derive $\underline{x}(t\mid t-1)$ in terms of $\underline{x}(t-1\mid t-1)$. From the previous discussion, the state vector is characterized by $$x(t) = A(t-1)x(t-1) + \omega(t-1)w(t-1)$$

Because $\underline{w}(t)$ has zero mean, $$m_x(t) = A(t-1)m_x(t-1).$$

From the previous page, $$x(t-1) = m_x(t) + R_{xd}(t,t-1)R_{dd}^{-1}(t-1)[d(t-1) - m_d(t-1)].$$

where $$R_{xd}(t,t-1) = E[[x(t) - m_x(t)][d(t-1) - m_d(t-1)]^H].$$

Observe that $$x(t) - m_x(t) = A(t-1)[x(t-1) - m_x(t-1)] + \omega(t-1)w(t-1).$$

Hence, $$R_{xd}(t, t-1) =$$
$$A(t-1)E[[x(t-1) - m_x(t-1)][d(t-1) - m_d(t-1)]^H]$$
$$\omega(t-1)E[w(t-1)[d(t-1) - m_d(t-1)]^H].$$

The most current observation in the data vector $\underline{d}(t-1)$ is $\underline{y}(t-1) = c(t-1)\underline{x}(t-1)$ which involves $\underline{w}$ only up to time $(t-2)$. Thus $\underline{w}(t-1)$ is statistically independent of $\underline{d}(t-1)$. Therefore, $$E[w(t-1)[d(t-1) - m_d(t-1)]^H] = E[w(t-1)]E[[d(t-1) - m_d(t-1)]] = [0].$$

We conclude that $$R_{xd}(t, t-1) = A(t-1)R_{xd}(t-1).$$

Substituting for $\underline{m}_x(t)$ and $R_{xd}(t,t-1)$, the estimator becomes $$x(t\ t-1) = A(t-1)m_x(t-1) + A(t-1)R_{xd}(t-1)R_{dd}^{-1}(t-1)[d(t-1) - m_d(t-1)]$$
$$= A(t-1)[m_x(t-1) + R_{xd}(t-1)R_{dd}^{-1}(t-1)[d(t-1) - m_d(t-1)]].$$

However, $$x(t-1\ t-1) = m_x(t-1) + R_{xd}(t-1)R_{dd}^{-1}(t-1)[d(t-1) - m_d(t-1)].$$

We conclude that $$x(t-1\ t-1) = A(t-1)x(t-1\ t-1).$$

In a similar fashion, $P(t\ t-1)$ is expressed in terms of $P(t-1\ t-1)$. By definition, $$\epsilon_x(t\ t-1) = x(t) - x(t\ t-1)$$
$$= A(t-1)x(t-1) + \omega(t-1)w(t-1) - A(t-1)x(t-1\ t-1)$$
$$= A(t-1)[x(t-1) - x(t-1\ t-1)] + \omega(t-1)w(t-1)$$
$$= A(t-1)\epsilon_x(t-1\ t-1) + \omega(t-1)w(t-1).$$

Because the estimator is unbiased, $E[\epsilon_x(t\ t-1)] = 0$ and the error covariance matrix is given by $$P(t\ t-1) = E[\epsilon_x(t\ t-1)\epsilon_x^H(t\ t-1)]$$
$$= E[[A(t-1)\epsilon_x(t-1\ t-1) + \omega(t-1)w(t-1)][\epsilon_x^H(t-1\ t-1)A^H(t-1) + w(t-1)\omega^H(t-1)]]$$
$$= A(t-1)E[\epsilon_x(t-1\ t-1)\epsilon_x^H(t-1\ t-1)]A^H(t-1) + \omega(t-1)E[w(t-1)\epsilon_x^H(t-1\ t-1)]A^H(t-1) +$$
$$A(t-1)E[\epsilon_x(t-1\ t-1)w^H(t-1)]\omega^H(t-1) + \omega(t-1)E[w(t-1)w^H(t-1)]\omega^H(t-1).$$

However, $\epsilon_x(t-1\ t-1) = \underline{x}(t-1) - \underline{x}(t-1\ t-1)$ involves the white noise sequence $\underline{w}$ only up to time $(t-2)$. Hence, $\underline{w}(t-1)$ is statistically independent of $\epsilon_x(t-1\ t-1)$. Because $\underline{w}(t-1)$ has zero mean, $$E[w(t-1)\epsilon_x^H(t-1\ t-1)] =$$
$$E[w(t-1)]E[\epsilon_x^H(t-1\ t-1)] = [0]$$

$$E[\epsilon_x(t-1\ t-1)\ w^H(t-1)] =$$

$$E[\epsilon(t-1\ t-1)]E[w^H(t-1)] = [0].$$

Also, $$E[\epsilon_x(t-1\ t-1)\epsilon_x^H(t-1\ t-1)] = P(t-1\ t-1)$$

and $$E[w(t-1)w^H(t-1)] = R_{ww}(t-1, t-1) = Q(t-1)$$

where, $$Q(t-1) =$$

$$\begin{bmatrix} \sigma_\mu^2(t-1)\sigma_q^2(t-1) & 0 \\ \hline \sigma_\mu^2(t-1) + \sigma_q^2(t-1) & \\ 0 & \sigma_\mu^2(t-1) + \sigma_q^2(t-1) \end{bmatrix}.$$

We conclude that $$P(t\ t-1) = A(t-1)P(t-1\ t-1)A^H(t-1) + W(t-1)Q(t-1)W^H(t-1).$$

The final expression to be derived relates $P(t\ t)$ to $P(t\ t-1)$. Recall that $$\epsilon_x(t\ t) = x(t) - x(t\ t).$$

From our earlier discussion, $$x(t\ t) = x(t\ t-1) + K(t)e(t).$$

Thus, $$\epsilon_x(t\ t) = x(t) - x(t\ t-1) - K(t)e(t)$$
$$= \epsilon_x(t\ t-1) - K(t)e(t).$$

Because $\epsilon_x(t\ t)$ has zero mean, the error covariance matrix $P(t\ t)$ is $$P(t\ t) = E[\epsilon_x(t\ t)\epsilon_x^H(t\ t)] = E[[\epsilon_x(t\ t-1) - K(t)e(t)][\epsilon_x^H(t\ t-1) - e^*(t)K^H(t)]]$$
$$= E[\epsilon_x(t\ t-1)\epsilon_x^H(t\ t-1)] - K(t)E[e(t)\epsilon_x^H(t\ t-1)] - E[\epsilon_x(t\ t-1)e^*(t)]K^H(t) +$$

$$K(t)E[e(t)e^*(t)]K^H(t).$$

Since $$\epsilon_x(t\ t-1) = x(t) - (t\ t-1),$$

it follows that $$E[\epsilon_x(t\ t-1)e^*(t)] = E[x(t)e^*(t)] - E[x(t\ t-1)\ e^*(t)].$$

However, $$x(t\ t-1) = m_x(t) + R_{xd}(t,t-1) R_{dd}^{-1}(t-1) [d(t-1) - m_d(t-1)].$$

Therefore, $$E[x_x(t\ t-1)e^*(t)] = E[m_x(t)e^*(t)] + R_{xd}(t,t-1)R_{dd}^{-1}(t-1) E[[d(t-1) - m_d(t-1)]e^*(t)]$$

It was shown previously that e(t) is orthogonal to the data prior to time t. Hence, $$E[[d(t-1) - m_d(t-1)]e^*(t)] = \underline{0}$$

We conclude that $$\begin{aligned} E[\epsilon_x(t\ t-1)e^*(t)] &= E[x(t)e^*(t)] - E[m_x(t)e^*(t)] \\ &= E[[x(t) - m_x(t)]e^*(t)] = R_{xe}(t,t). \end{aligned}$$

From the previous discussion, $$R_{xe}(t,t) = P(t\ t-1)c^H(t).$$

It follows that $$\begin{aligned} P(t\ t) &= P(t\ t-1) - K(t)c(t)P(t\ t-1) - \\ &\quad P(t\ t-1)c^H(t)K^H(t) + K(t)\sigma_e^2(t)K^H(t) \\ &= [I - K(t)c(t)]P(t\ t-1) - P(t\ t-1)c^H(t)K^H(t) + \\ &\quad K(t)\sigma_e^2(t)K^H(t). \end{aligned}$$

It was shown earlier that $$K(t) = \frac{P(t\ t-1)c^H(t)}{\sigma_e^2(t)}.$$

Substituting into the last two terms in P(t t), the expression becomes $$P(t\ t) = [I - K(t)c(t)]P(t\ t-1) - $$
$$P(t\ t-1)c^H(t) \frac{c(t)P(t\ t-1)}{\sigma_e^2(t)} + $$
$$\frac{P(t\ t-1)c^H(t)}{\sigma_e^2(t)} \sigma_e^2(t) \frac{c(t)P(t\ t-1)}{\sigma_e^2(t)}.$$

The last two terms cancel and we obtain $$P(t\ t) = [I - K(t)\ c(t)]P(t\ t-1).$$

This completes the derivation of the Kalman filter based on the innovations sequence. Note that the Gaussian assumption was not invoked during the derivation. The Kalman filter algorithm is now summarized.

1. State prediction $$x(t\ t-1) = A(t-1)\ x(t-1\ t-1).$$

2. Covariance predition $$P(t\ t-1) = $$
$$A(t-1)P(t-1\ t-1)A^H(t-1) + \omega(t-1)Q(t-1)\omega^H(t-1).$$

$$Q(t-1) = $$

$$\begin{bmatrix} \frac{\sigma_\mu^2(t-1)\sigma_q^2(t-1)}{\sigma_\mu^2(t-1) + \sigma_q^2(t-1)} & 0 \\ 0 & \sigma_\mu^2(t-1) + \sigma_q^2(t-1) \end{bmatrix}.$$

3. Innovation covariance $$R_e(t) = c(t)\ P(t\ t-1)\ c^H(t)$$

4. Kalman gain $$K(t) = \frac{P(t\ t-1)c^H(t)}{\sigma_e^2(t)}.$$

5. Innovation generation $$e(t) = y(t) - y(t\ t-1)$$
$$y(t\ t-1) = c(t)x(t\ t-1)$$
$$\therefore e(t) = y(t) - c(t)x(t\ t-1)$$

6. State correction $$x(t\ t) = x(t\ t-1) + K(t)\ e(t)$$

7. Covariance correction $$P(t\ t) = [I - K(t)\ c(t)]P(t\ t-1)$$

4. Evaluation of Clutter Cancellation Method

The purpose of the clutter cancellation method is to reduce $P_{SAT}$ of the A/D converter. The assumption is that the clutter innovations process is much smaller than the clutter itself. A measure of the method's effectiveness is the ratio of the innovations variance to the observed clutter variance.

An expression is first developed for the observed clutter variance. With reference to the previous discussion, the clutter is assumed to have the state-space representation $$x(t) = A(t-1)\ x(t-1) + \omega(t-1)\ w(t-1)$$

where $\underline{w}(t)$ is a zero-mean white noise sequence with covariance matrix $$R_{ww}(k,j) = Q(k)\ \delta_{jk}$$

$$Q(k) = $$

$$\begin{bmatrix} \frac{\sigma_\mu^2(k)\sigma_q^2(k)}{\sigma_\mu^2(k) + \sigma_q^2(k)} & 0 \\ 0 & \sigma_\mu^2(k) + \sigma_q^2(k) \end{bmatrix} = \begin{bmatrix} q_{11}(k) & 0 \\ 0 & q_{22}(k) \end{bmatrix}$$

Note that $$m_x(t) = A(t-1)\ m_x(t-1)$$

$$m_y(t) = c(t)\ m_x(t).$$

The covariance matrix of $\underline{x}(t)$ is defined to be $$V(t\ t) = E[[x(t) - m_x(t)][x(t) - m_x(t)]^H].$$

Note that $$x(t) - m_x(t) = A(t-1)[x(t-1) - m_x(t-1)] + \omega(t-1) w(t-1).$$

It follows that $$V(t) = E[A(t-1)[x(t-1) - m_x(t-1)] + \omega(t-1) w(t-1)] \\ [[x(t-1) - m_x(t-1)]^H A^H(t-1) + w^H(t-1) \omega^H(t-1)]].$$

Since, $$x(t-1) = A(t-2) x(t-2) + \omega(t-2) w(t-2),$$

$\underline{x}(t-1)$ depends upon values of $\underline{w}(t)$ that occur prior to $(t-1)$. Hence $\underline{w}(t-1)$ and $\underline{x}t-\overline{1})$ are statistically independent due to the white noise assumption. Hence, the cross terms in V(t) average to zero and $$V(t) = A(t-1) V(t-1) A^H(t-1) + \omega(t-1) Q(t-1) \omega^H(t-1).$$

the covariance matrix of $\underline{y}(t)$ is given by $$R_y(t) = E[[y(t) - m_y(t)][y(t) - m_y(t)]^H].$$

By inspection, $$y(t) - m_y(t) = c(t) [x(t) - m_x(t)].$$

It follows that $$R_y(t) = c(t) V(t) c^H(t).$$

The performance index is then defined to be $$J = \frac{R_e(t)}{R_y(t)} = \frac{\sigma_e^2(t)}{\sigma_y^2(t)}.$$

Evaluation of the performance index is difficult to accomplish for the general case. Consequently, the following simplifying, but nontrivial, assumptions are made:
1. The processes are stationary. Hence, $A(t-1)$, $\omega(t-1$, $c(t)$ and $Q(t)$ are time independent. For convenience, we write $A$, $\omega$, $c$, and $Q$, respectively.
2. The system is in steady state. This implies that $$V(t) = V(t-1) = \text{constant},$$
$$P(t \ t-1) = P(t-1 \ t-2) = \text{constant},$$
$$K(t) = \text{constant}$$
$$R_e(t) = \sigma_e^2(t) = \text{constant}.$$

3. The clutter can be modeled as a first-under autogressive process. Hence $a_2 = a_3 \ldots a_p = 0$ (i.e. only $a_1$, is nonzero).

Using canonical realization #1, the matrices and vectors in the state-space representation become $$A = \begin{bmatrix} -a_1 & B \\ 0 & 0 \end{bmatrix} \text{ where } B = \frac{\sigma_\mu^2}{\sigma_\mu^2 + \sigma_q^2}$$

$$\omega = \begin{bmatrix} 1 & 0 \\ 0 & 1 \end{bmatrix} \quad c = [-a_1 \ 1]$$

$$x(t) = \begin{bmatrix} F(t) \\ n(t) \end{bmatrix} = \begin{bmatrix} F_1(t) \\ n(t) \end{bmatrix} = \begin{bmatrix} y(t-1) \\ n(t) \end{bmatrix}$$

-continued where $n(t) = \mu(t) + q(t)$ $$w(t) = \begin{bmatrix} h(t) \\ n(t+1) \end{bmatrix} = \begin{bmatrix} \mu(t) - Bn(t) \\ n(t+1) \end{bmatrix}.$$

As a check, note that
$$x(t) = A \ x(t-1) + \omega w(t-1)$$

becomes $$\begin{bmatrix} y(t-1) \\ n(t) \end{bmatrix} = \begin{bmatrix} -a_1 & B \\ 0 & 0 \end{bmatrix} \begin{bmatrix} y(t-2) \\ n(t-1) \end{bmatrix} +$$

$$\begin{bmatrix} 1 & 0 \\ 0 & 1 \end{bmatrix} \begin{bmatrix} \mu(t-1) - Bn(t-1) \\ n(t) \end{bmatrix}.$$

This is equivalent to the two equations $$y(t-1) = -a_1 y(t-2) + Bn(t-1) + \\ \mu(t-1) - Bn(t-1) = -a_1 y(t-2) + \mu(t-1) \\ \text{and} \\ n(t) = n(t).$$

The first equation is recognized as the model of a first-order AR process in the absence of observation noise. The observation is given by $$y(t) = c \ x(t) = [-a_1 \ 1] \begin{bmatrix} y(t-1) \\ n(t) \end{bmatrix} = \\ -a_1 y(t-1) + n(t) = -a_1 y(t-1) + \mu(t) + q(t)$$

where q(t) is the observation noise.
It is shown that $$V(t) = A(t-1) V(t-1) A^H(t-1) + \omega(t-1) Q(t-1) \omega^H(T-1).$$

In the steady state, let $$V(t) = V(t-1) = \begin{bmatrix} v_{11} & v_{12} \\ v_{21} & v_{22} \end{bmatrix}.$$

It follows that $$\begin{bmatrix} v_{11} & v_{12} \\ v_{21} & v_{22} \end{bmatrix} = \begin{bmatrix} -a_1 & B \\ 0 & 0 \end{bmatrix} \begin{bmatrix} v_{11} & v_{12} \\ v_{21} & v_{22} \end{bmatrix} \begin{bmatrix} -a_1^* & 0 \\ B^* & 0 \end{bmatrix} +$$

$$\begin{bmatrix} 1 & 0 \\ 0 & 1 \end{bmatrix} \begin{bmatrix} q_{11} & 0 \\ 0 & q_{22} \end{bmatrix} \begin{bmatrix} 1 & 0 \\ 0 & 1 \end{bmatrix} =$$

$$\begin{bmatrix} -a_1 & B \\ 0 & 0 \end{bmatrix} \begin{bmatrix} -a_1^* v_{11} + B^* v_{12} & 0 \\ -a_1^* v_{21} + B^* v_{22} & 0 \end{bmatrix} + \begin{bmatrix} q_{11} & 0 \\ 0 & q_{22} \end{bmatrix} =$$

$$\begin{bmatrix} +a_1^2 v_{11} - a_1 B^* v_{12} - a_1^* B v_{21} + B^2 v_{22} & 0 \\ 0 & 0 \end{bmatrix} =$$

-continued $$\begin{bmatrix} q_{11} & 0 \\ 0 & q_{22} \end{bmatrix} =$$

$$\begin{bmatrix} a_1{}^2 v_{11} - a_1 B^* v_{12} - a_1{}^* B v_{21} + B^2 v_{22} + q_{11} & 0 \\ 0 & q_{22} \end{bmatrix}.$$

By inspection, $$v_{12} = v_{21} = 0, \; v_{22} = q_{22}.$$
$$v_{11} = a_1{}^2 v_{11} + B^2 q_{22} + q_{11}$$

$$(1 - a_1{}^2) v_{11} = B^2 q_{22} + q_{11} =$$

$$\left[\frac{\sigma_\mu{}^2}{\sigma_\mu{}^2 + \sigma_q{}^2}\right]^2 (\sigma_\mu{}^2 + \sigma_q{}^2) + \frac{\sigma_\mu{}^2 \sigma_q{}^2}{\sigma_\mu{}^2 + \sigma_q{}^2} =$$

$$\frac{\sigma_\mu{}^4}{\sigma_\mu{}^2 + \sigma_q{}^2} + \frac{\sigma_\mu{}^2 \sigma_q{}^2}{\sigma_\mu{}^2 + \sigma_q{}^2} = \frac{\sigma_\mu{}^2(\sigma_\mu{}^2 + \sigma_q{}^2)}{\sigma_\mu{}^2 + \sigma_q{}^2} = \sigma_\mu{}^2$$

$$\therefore v_{11} = \frac{\sigma_\mu{}^2}{1 - a_1{}^2}$$

$$v_{22} = \sigma_\mu{}^2 + \sigma_q{}^2.$$

From above, $R_y(t)$ is given by $$R_y(t) = \sigma_y{}^2(t) = c(t) V(t) c^H(t).$$

Consequently, in the steady state we have $$R_y(t) = [-a_1 \; 1] \begin{bmatrix} v_{11} & 0 \\ 0 & v_{22} \end{bmatrix} \begin{bmatrix} -a_1{}^* \\ 1 \end{bmatrix} = [-a_1 \; 1] \begin{bmatrix} -a_1{}^* v_{11} \\ v_{22} \end{bmatrix}.$$

$$\sigma_y{}^2 = a_1{}^2 v_{11} + v_{22} = \frac{a_1{}^2}{1 - a_1{}^2} \sigma_\mu{}^2 + \sigma_\mu{}^2 + \sigma_q{}^2$$

$$\sigma_y{}^2 = \frac{a_1{}^2 + 1 - a_1{}^2}{1 - a_1{}^2} \sigma_\mu{}^2 + \sigma_q{}^2 = \frac{\sigma_\mu{}^2}{1 - a_1{}^2} + \sigma_q{}^2.$$

Having derived $\sigma_y{}^2$, we now develop an expression for $\sigma_e{}^2$. In the steady-state, let $$P(t|t-1) = \begin{bmatrix} P_{11} & P_{12} \\ P_{21} & P_{22} \end{bmatrix}.$$

From above, the covariance prediction equation is $$P(t-1) = A P(t-1 \; t-1) A^H + \omega Q \omega^H$$

Also, the covariance correction equation is $$P(t \; t) = [I - K(t) c(t)] P(t \; t-1).$$

Substituting the second equation into the first, we have $$P(t \; t-1) = A[I - K(t-1) c(t-1)] P(t-1 \; t-2) A^H + Q$$

The Kalman gain is $$K(t) = \frac{P(t \; t-1) c^H(t)}{\sigma_e{}^2(t)}.$$

Substituting for the Kalman gain, the expression for $P(t \; t-1)$ becomes $$P(t \; t-1) =$$

$$A \left[ I - \frac{P(t-1 \; t-2) c^H}{\sigma_e{}^2} c \right] P(t-1 \; t-2) A^H + Q$$

For convenience, let $$\left[ I - \frac{P(t-1 \; t-2) c^H c}{\sigma_e{}^2} \right] P(t-1 \; t-2) = \begin{bmatrix} \alpha & \beta \\ \gamma & \delta \end{bmatrix}.$$

Then $$P(t|t-1) = \begin{bmatrix} -a_1 & B \\ 0 & 0 \end{bmatrix} \begin{bmatrix} \alpha & \beta \\ \gamma & \delta \end{bmatrix} \begin{bmatrix} -a_1{}^* & 0 \\ B^* & 0 \end{bmatrix} + \begin{bmatrix} q_{11} & 0 \\ 0 & q_{22} \end{bmatrix}.$$

$$\begin{bmatrix} P_1 & P_{12} \\ P_{21} & P_{22} \end{bmatrix} = \begin{bmatrix} -a_1 & B \\ 0 & 0 \end{bmatrix} \begin{bmatrix} -a_1{}^* \alpha + B^* \beta & 0 \\ -a_1{}^* \gamma + B^* \delta & 0 \end{bmatrix} +$$

$$\begin{bmatrix} q_{11} & 0 \\ 0 & q_{22} \end{bmatrix}$$

$$= \begin{bmatrix} |a_1|^2 \alpha - a_1 B^* \beta - a_1{}^* B \gamma + |B|^2 \delta & 0 \\ 0 & 0 \end{bmatrix} + \begin{bmatrix} q_{11} & 0 \\ 0 & q_{22} \end{bmatrix}.$$

$$\begin{bmatrix} P_{11} & P_{12} \\ P_{21} & P_{22} \end{bmatrix} =$$

$$\begin{bmatrix} |a_1|^2 \alpha - a_1 B^* \beta - a_1{}^* B \gamma + |B|^2 \delta + q_{11} & 0 \\ 0 & q_{22} \end{bmatrix}$$

By inspection, $$P_{12} = P_{21} = 0 \text{ and } P_{22} = q_{22}.$$
$$P_{11} = |a_1|^2 \alpha - a_1 B^* \beta - a_1{}^* B \gamma + |B|^2 \delta + q_{11}.$$

Invoking the steady-state assumption, $\alpha$, $\beta$, $\gamma$, and $\delta$ are determined from $$\begin{bmatrix} \alpha & \beta \\ \gamma & \delta \end{bmatrix} = \left[ \begin{bmatrix} 1 & 0 \\ 0 & 1 \end{bmatrix} - \frac{1}{\sigma_e{}^2} \begin{bmatrix} P_{11} & 0 \\ 0 & q_{22} \end{bmatrix} \begin{bmatrix} -a_1{}^* \\ 1 \end{bmatrix} [-a_1 \; 1] \right] \begin{bmatrix} P_{11} & 0 \\ 0 & q_{22} \end{bmatrix}$$

$$= \left[ \begin{bmatrix} 1 & 0 \\ 0 & 1 \end{bmatrix} - \frac{1}{\sigma_e^2} \begin{bmatrix} P_{11} & 0 \\ 0 & q_{22} \end{bmatrix} \begin{bmatrix} |-a_1|^2 & -a_1^* \\ -a_1 & 1 \end{bmatrix} \right] \begin{bmatrix} P_{11} & 0 \\ 0 & q_{22} \end{bmatrix}$$

$$= \left[ \begin{bmatrix} 1 & 0 \\ 0 & 1 \end{bmatrix} - \frac{1}{\sigma_e^2} \begin{bmatrix} |a_1|^2 P_{11} & -a_1^* P_{11} \\ -a_1 q_{22} & q_{22} \end{bmatrix} \right] \begin{bmatrix} P_{11} & 0 \\ 0 & q_{22} \end{bmatrix}$$

$$\begin{bmatrix} \alpha & \beta \\ \gamma & \delta \end{bmatrix} = \begin{bmatrix} \frac{1 - |a_1|^2 P_{11}}{\sigma_e^2} & \frac{a_1^* P_{11}}{\sigma_e^2} \\ \frac{a_1 q_{22}}{\sigma_e^2} & 1 - \frac{q_{22}}{\sigma_e^2} \end{bmatrix} \begin{bmatrix} P_{11} & 0 \\ 0 & q_{22} \end{bmatrix}$$

$$= \begin{bmatrix} P_{11} - \frac{|a_1|^2 P_{11}^2}{\sigma_e^2} & \frac{a_1^* P_{11} q_{22}}{\sigma_e^2} \\ \frac{a_1 q_{22} P_{11}}{\sigma_e^2} & q_{22} - \frac{q_{22}^2}{\sigma_e^2} \end{bmatrix}$$

It follows that $$\alpha = P_{11} - \frac{|a_1|^2 P_{11}^2}{\sigma_e^2} = \frac{\sigma_e^2 P_{11} - |a_1|^2 P_{11}^2}{\sigma_e^2} = \frac{P_{11}(\sigma_e^2 - |a_1|^2 P_{11})}{\sigma_e^2}$$

$$\beta = \frac{a_1^* P_{11} q_{22}}{\sigma_e^2}$$

$$\gamma = \frac{a_1^* q_{22} P_{11}}{\sigma_e^2}$$

$$\delta = q_{22} - \frac{q_{22}^2}{\sigma_e^2} = \frac{\sigma_e^2 q_{22} - q_{22}^2}{\sigma_e^2} = \frac{q_{22}(\sigma_e^2 - q_{22})}{\sigma_e^2}.$$

Substituting $\alpha$, $\beta$, $\delta$, and $\gamma$ into the previous expression for $P_{11}$, we obtain $$P_{11} = \frac{|a_1|^2 P_{11}(\sigma_e^2 - |a_1|^2 P_{11})}{\sigma_e^2} - \frac{|a_1|^2 B^* P_{11} q_{22}}{\sigma_e^2} -$$

$$\frac{|a_1|^2 B P_{11} q_{22}}{\sigma_e^2} + |B|^2 \frac{q_{22}(\sigma_e^2 - q_{22})}{\sigma_e^2} + q_{11}.$$

The above equation involves the unknown quantity $\sigma_e^2$. To eliminate $\sigma_e^2$, use is made of the innovations covariance equation $$R_e(t) = \sigma_e^2(t) = c(t) P(t\,t-1) c^H(t).$$

Substituting for the various matrices, we obtain $$\sigma_e^2 = [-a_1\ 1] \begin{bmatrix} P_{11} & 0 \\ 0 & q_{22} \end{bmatrix} \begin{bmatrix} -a_1^* \\ 1 \end{bmatrix} = [-a_1\ 1] \begin{bmatrix} -a_1^* P_{11} \\ q_{22} \end{bmatrix}$$

$$= |a_1|^2 P_{11} + q_{22}.$$

Note that $\sigma_e^2 - |a_1|^2 P_{11} = q_{22}$ and $\sigma_e^2 - q_{22} = |a_1|^2 P_{11}$.

Multiplying the equation for $P_{11}$ by $\sigma_e^2$ and using the above results, we obtain $$P_{11} \sigma_e^2 = |a_1|^2 P_{11} q_{22} - |a_1|^2 B^* P_{11} q_{22} - |a_1|^2 B P_{11} q_{22} +$$
$$|B|^2 q_{22} |a_1|^2 P_{11} + q_{11} \sigma_e^2.$$

$$P_{11}|a_1|^2 + q_{22} P_{11} = |a_1|^2 P_{11} q_{22} - |a_1|^2 B^* P_{11} q_{22} -$$
$$|a_1|^2 B P_{11} q_{22} |B|^2 q_{22} |a_1|^2 P_{11} + |a_1|^2 P_{11} q_{11} + q_{11} q_{22}.$$

The above is a quadratic equation in $P_{11}$ which can be rewritten in the form $$P_{11}^2 + \left[ B^* q_{22} + B q_{22} + \frac{q_{22}}{|a_1|^2} - q_{22} - |B|^2 q_{22} - q_{11} \right] P_{11} -$$

$$\frac{q_{11} q_{22}}{|a_1|^2} = 0.$$

Recall that $$B = \frac{\sigma_\mu^2}{\sigma_\mu^2 + \sigma_q^2},\ q_{11} = \frac{\sigma_\mu^2 \sigma_q^2}{\sigma_\mu^2 + \sigma_q^2},\ q_{22} = \sigma_\mu^2 + \sigma_q^2.$$

Hence, the coefficient of $P_{11}$ becomes $$b = \frac{\sigma_\mu^2}{(\sigma_\mu^2 + \sigma_q^2)} (\sigma_\mu^2 + \sigma_q^2) +$$

$$\frac{\sigma_\mu^2}{(\sigma_\mu^2 + \sigma_q^2)} (\sigma_\mu^2 + \sigma_q^2) + \frac{\sigma_\mu^2 + \sigma_q^2}{|a_1|^2} \cdot$$

$$- \sigma_\mu^2 - \sigma_q^2 - \left[ \frac{\sigma_\mu^2}{\sigma_\mu^2 + \sigma_q^2} \right]^2 (\sigma_\mu^2 + \sigma_q^2) - \frac{\sigma_\mu^2 \sigma_q^2}{\sigma_\mu^2 + \sigma_q^2}$$

-continued
$$b = \sigma_\mu^2 + \sigma_\mu^2 + \frac{\sigma_\mu^2 + \sigma_q^2}{|a_1|^2} - \sigma_\mu^2 - \sigma_q^2 - \frac{\sigma_\mu^4}{\sigma_\mu^2 + \sigma_q^2} - \frac{\sigma_\mu^2 \sigma_q^2}{\sigma_\mu^2 + \sigma_q^2}$$

$$= \sigma_\mu^2 + \frac{\sigma_\mu^2 + \sigma_q^2}{|a_1|^2} - \sigma_q^2 - \frac{\sigma_\mu^2(\sigma_\mu^2 + \sigma_q^2)}{(\sigma_\mu^2 + \sigma_q^2)}$$

$$= \frac{\sigma_\mu^2 + \sigma_q^2 - |a_1|^2 \sigma_q^2}{|a_1|^2} = \frac{\sigma_\mu^2 + \sigma_q^2(1 - |a_1|^2)}{|a_1|^2}.$$

Also, the coefficient $$\frac{q_{11}q_{22}}{|a_1|^2}$$

becomes $$c = \frac{\sigma_\mu^2 \sigma_q^2}{(\sigma_\mu^2 + \sigma_q^2)} \frac{(\sigma_\mu^2 + \sigma_q^2)}{|a_1|^2} = \frac{\sigma_\mu^2 \sigma_q^2}{|a_1|^2}.$$

Thus, the quadratic equation in $P_{11}$ is given by $$P_{11}^2 + \frac{\sigma_\mu^2 + \sigma_q^2(1 - |a_1|^2)}{|a_1|^2} P_{11} - \frac{\sigma_\mu^2 \sigma_q^2}{|a_1|^2} = 0$$

Solving for $P_{11}$, we have $$P_{11} = -\frac{\sigma_\mu^2 + \sigma_q^2(1 - a_1^{\ 2})}{a_1^{\ 2}} \pm$$

$$1/2 \sqrt{\left[\frac{\sigma_\mu^2 + \sigma_q^2(1 - a_1^{\ 2})}{a_1^{\ 2}}\right]^2 + \frac{4\sigma_\mu^2 \sigma_q^2}{a_1^{\ 2}}}$$

$$= -\frac{\sigma_\mu^2 + \sigma_q^2(1 - a_1^{\ 2})}{2 a_1^{\ 2}} \pm$$

$$\frac{1}{a_1^{\ 2}} \sqrt{[\sigma_\mu^2 + \sigma_q^2(1 - a_1^{\ 2})]^2 + 4\sigma_\mu^2 \sigma_q^2 a_1^{\ 2}}$$

Note that $$[\sigma_\mu^2 + \sigma_q^2(1 - a_1^{\ 2})]^2 + 4\sigma_\mu^2 \sigma_q^2 a_1^{\ 2} =$$
$$\sigma_\mu^4 + 2\sigma_\mu^2 \sigma_q^2(1 - a_1^{\ 2}) + \sigma_q^4(1 - a_1^{\ 2})^2 +$$
$$4\sigma_\mu^2 \sigma_q^2 a_1^{\ 2} = \sigma_\mu^4 + 2\sigma_\mu^2 \sigma_q^2(1 + a_1^{\ 2}) +$$
$$\sigma_q^4(1 - a_1^{\ 2})^2 = [\sigma_\mu^2 + \sigma_q^2(1 + a_1^{\ 2})]^2 -$$
$$4\sigma_q^4 a_1^{\ 2} = [\sigma_\mu^2 + \sigma_q^2(1 + a_1^{\ 2}) +$$
$$2\sigma_q^2 a_1^{\ 2}][\sigma_\mu^2 + \sigma_q^2(1 + a_1^{\ 2}) - 2\sigma_q^2 a_1^{\ 2}] =$$
$$[\sigma_\mu^2 + \sigma_q^2(1 + a_1^{\ 2})][\sigma_\mu^2 + \sigma_q^2(1 - a_1^{\ 2})]$$

Since $P_{11}$ must be nonnegative, the + sign in front of the square root must be used. Hence, $$P_{11} = \frac{\sqrt{[\sigma_\mu^2 + \sigma_q^2(1 + a_1^{\ 2})][\sigma_\mu^2 + \sigma_q^2(1 - a_1^{\ 2})]} - [\sigma_\mu^2 + \sigma_q^2(1 - a_1^{\ 2})]}{2 a_1^{\ 2}}.$$

Having solved for $P_{11}$, $\sigma_e^2$ is given by $$\sigma_e^2 = a_1^{\ 2} P_{11} + (\sigma_\mu^2 + \sigma_q^2).$$

The performance index is then given by $$J = \frac{\sigma_e^2}{\sigma_y^2} =$$

$$\frac{|a_1|^2 P_{11} + (\sigma_\mu^2 + \sigma_q^2)}{\frac{\sigma_\mu^2}{1 - |a_1|^2} + \sigma_q^2} = \frac{|a_1|^2 P_{11} + (\sigma_\mu^2 + \sigma_q^2)}{\frac{\sigma_\mu^2 + \sigma_q^2(1 - |a_1|^2)}{1 - |a_1|^2}}$$

$$= \frac{(1 - |a_1|^2)[|a_1|^2 P_{11} + (\sigma_\mu^2 + \sigma_q^2)]}{\sigma_\mu^2 = \sigma_q^2(1 - |a_1|^2)}$$

Note that $P_{11}$ can be written as $$P_{11} = \sigma_\mu^2 \frac{\sqrt{\left[1 + \frac{\sigma_q^2}{\sigma_\mu^2}(1 + |a_1|)^2\right]\left[1 + \frac{\sigma_q^2}{\sigma_\mu^2}(1 + |a_1|)^2\right]} - \left[1 + \frac{\sigma_q^2}{\sigma_\mu^2}(1 - |a_1|)^2\right]}{2|a_1|^2}$$

Hence, $J$ becomes $$J = \frac{(1 - |a_1|^2)}{2}$$

$$\frac{\sqrt{\left[1 + \frac{\sigma_q^2}{\sigma_\mu^2}(1 + |a_1|)^2\right]\left[1 + \frac{\sigma_q^2}{\sigma_\mu^2}(1 - |a_1|)^2\right]} - \left[1 + \frac{\sigma_q^2}{\sigma_\mu^2}(1 - |a_1|^2)\right] + \left[1 + \frac{\sigma_q^2}{\sigma_\mu^2}\right]}{1 + \frac{\sigma_q^2}{\sigma_\mu^2}(1 - |a_1|^2)}$$

-continued $$J = \frac{(1 - |a_1|^2)}{2} \frac{\sqrt{\left[1 + \frac{\sigma_q^2}{\sigma_\mu^2}(1 + |a_1|)^2\right]\left[1 + \frac{\sigma_q^2}{\sigma_\mu^2}(1 - |a_1|)^2\right]} + 1 + \frac{\sigma_q^2}{\sigma_\mu^2}(1 + |a_1|^2)}{1 + \frac{\sigma_q^2}{\sigma_\mu^2}(1 - |a_1|^2)}$$

Recall that q denotes observation noise while $\mu$ is the noise generating the clutter. Assuming the clutter to be much larger than the observation noise, $$\frac{\sigma_q^2}{\sigma_\mu^2} << 1.$$

For a stable process it is known that $a_1^2 < 1.$

It follows that J can be simplified to $J \approx (1 - a_1^2).$

Hence, when the clutter is much larger than the observation noise, the performance index is independent of $\sigma_q^2$ $\sigma_\mu^2$. As an example, let $a_1^2 = 0.99$. Then $J \approx 0.01.$ For this case the innovations process has a variance which is approximately 100 times smaller than the variance of the clutter. Since $0 < 1 - a_1^2 < 1$ for a stable process, some improvement will always be achieved. However, the amount of reduction in the innovations process relative to the clutter process will depend upon how close the clutter process pole is located to the unit circle in the z-plane. The closer $a_1^2$ is to unity, the better will be performance. This is reasonable because the closer is the pole to the unit circle, the more sharply peaked will be the clutter spectrum and the broader will be the shape of the autocorrelation sequence. The broader is the autocorrelation sequence, the more correlated are the clutter samples. The more correlated are the clutter samples, the better will be the Kalman filter estimate of the clutter. The better is the Kalman filter estimate of the clutter, the smaller will be the innovations sequence.

As a final check for the expression of J, consider the case in which the clutter is much smaller than the observation noise. Then $$\frac{\sigma_q^2}{\sigma_\mu^2} >> 1.$$

Under this assumption, the expression for J simplifies to $$J \approx \frac{(1 - a_1^2)}{2} \frac{\frac{\sigma_q}{\sigma_\mu}(1 + a_1)\frac{\sigma_q}{\sigma_\mu}(1 - a_1) + \frac{\sigma_q^2}{\sigma_\mu^2}(1 - a_1^2)}{\frac{\sigma_q^2}{\sigma_\mu^2}(1 - a_1^2)}$$

$$= \frac{\frac{\sigma_q^2}{\sigma_\mu^2}(1 - a_1^2) + \frac{\sigma_q^2}{\sigma_\mu^2}(1 + a_1^2)}{2\frac{\sigma_q^2}{\sigma_\mu^2}} = \frac{2\frac{\sigma_q^2}{\sigma_\mu^2}}{2\frac{\sigma_q^2}{\sigma_\mu^2}} = 1.$$

This is a reasonable result because $\sigma_y^2 \approx \sigma_q^2$ and $\sigma_e^2 \approx \sigma_q^2.$ For the example considered, the improvement factor was found to be $J \approx 0.01$. In decibels, the dynamic range requirement is reduced by approximately 20 dB. Since each 6 dB reduction corresponds to one less bit needed by the A/D converter, the reduction of 20 dB translates to a 3 bit improvement.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A hybrid clutter cancellation system for use with a radar system which has a radar antenna and a radar receiver, said radar antenna producing output signals when it receives radar echo return signals containing clutter echo return signals and moving target echo return signals, said radar receiver receiving and amplifying said output signals of said antenna to produce thereby output signals including analog radar radar echo return signals, said hybrid clutter cancellation system comprising:

a means for subtracting analog signals, said subtracting means subtracting an estimate of said clutter echo return signals from said analog radar echo return signals produced by said radar receiver, said subtracting means producing thereby output signals which contain said moving target echo return signals;

a means for digitally producing output signals including said estimate of said clutter echo return signals, said producing means receiving said output signals from said subtracting means, and producing therefrom output signals including said estimate of said clutter echo return signal for said subtracting means, and wherein said producing means comprises an analog to digital converter unit which is electrically connected with subtracting means to produce thereby digital signals which represent the output signals of said subtracting means; a digital signal processor which receives said digital signals from said analog to digital converter to produce therefrom digital signals representing said clutter echo return signals; and a waveform generator which produces said output signals of said producing means by generating an estimate of said clutter echo return signals for said subtracting means from said digital signals from said digital signal processor; and a means for displaying said moving target echo return signals, said displaying means receiving said output signals from said producing means to produce therefrom a display signal representing said moving target echo return signals.

2. A hybrid clutter cancellation system for use with a radar system which has a radar antenna and a radar receiver, said radar antenna producing output signals when it receives radar echo return signals containing clutter echo return signals and moving target echo return signals, said radar receiver receiving and amplifying said output signals of said antenna to produce thereby output signals including analog radar echo return signals, said hybrid clutter cancellation system comprising:

a means for subtracting analog signals, said subtracting means subtracting an estimate of said clutter echo return signals from said analog radar echo return signals produced by said radar receiver, said subtracting means producing thereby output signals which contain said moving target echo return signals, wherein said subtracting means comprises an analog amplifier summing unit which has: an input terminal, an inverting input terminal, and an output terminal, said analog amplifier summing unit producing its output signals by subtracting said estimate of said clutter echo return signals from said analog radar echo return signals, said analog amplifier summing unit being electrically connected with said radar receiver with its input terminal;

a means for digitally producing output signals including said estimate of said clutter echo return signals, said producing means receiving said output signals from said subtracting means, and producing therefrom output signals including said estimate of said clutter echo return signal for said subtracting means, and wherein said producing means comprises an analog to digital converter unit which is electrically connected with subtracting means to produce thereby digital signals which represent the output signals of said subtracting means; a digital signal processor which receives said digital signals from said analog to digital converter to produce therefrom digital signals representing said clutter echo return signals; and a waveform generator which produces said output signals of said producing means by generating an estimate of said clutter echo return signals for said subtracting means from said digital signals from said digital signal processor; and a means for displaying said moving target echo return signals, said displaying means receiving said output signals from said producing means to produce therefrom a display signal representing said moving target echo return signals.

3. A hybrid clutter cancellation process for use with a radar system which has a radar antenna and a radar receiver, said radar antenna producing output signals when it receives radar echo return signals containing clutter echo return signals and moving target echo return signals, said radar receiver receiving and amplifying said output signals of said antenna to produce thereby output signals including analog radar echo return signals, said hybrid clutter cancellation process comprising the steps of:

subtracting an estimate of said clutter echo return signals from said analog radar echo return signals produced by said radar receiver, said subtracting step producing thereby output signals which contain said moving target echo return signals; wherein said subtracting step comprises using an analog amplifier summing unit which has: an input terminal, an inverting input terminal, and an output terminal, said analog amplifier summing unit producing its output signals by subtracting said estimate of said clutter echo return signals from said radar echo return signals, said analog amplifier summing unit being electrically connected said radar receiver with its input terminal, said subtracting step producing thereby output signals which contain said moving target echo return signals;

digitally producing output signals including said estimate of said clutter echo return signals, said producing step receiving said output signals from said subtracting step, and producing therefrom output signals including said estimate of said clutter echo return signal for said subtracting step; wherein said producing step comprises using: an analog to digital converter unit which is electrically connected with said analog amplifier summing unit to produce thereby digital signals which represent the output signals of said subtracting step; a digital signal processor which receives said digital signals from said analog to digital converter to produce therefrom digital signals representing said clutter echo return signals; and a waveform generator which produces said output signals of said producing step by generating an estimate of said clutter echo return signals for said subtracting means from said digital signals from said digital signal processor;

displaying said moving target echo return signals, said displaying step receiving said output signal from said producing step to produce therefrom a display signal representing said moving target echo return signals; and repeating said subtracting step, said producing step and said displaying step for subsequent radar echo return signals received by said radar system.

4. A hybrid clutter cancellation process, as defined in claim 3, wherein said waveform generator is an analog signal generator which is controlled by said digital signal processor to produce said estimate of said clutter echo return signals as a Kalman filter estimator.

* * * * *